(12) United States Patent
Suzuki et al.

(10) Patent No.: US 6,819,790 B2
(45) Date of Patent: Nov. 16, 2004

(54) MASSIVE TRAINING ARTIFICIAL NEURAL NETWORK (MTANN) FOR DETECTING ABNORMALITIES IN MEDICAL IMAGES

(75) Inventors: Kenji Suzuki, Clarendon Hills, IL (US); Kunio Doi, Willowbrook, IL (US)

(73) Assignee: The University of Chicago, Chicago, IL (US)

( * ) Notice: Subject to any disclaimer, the term of this patent is extended or adjusted under 35 U.S.C. 154(b) by 259 days.

(21) Appl. No.: 10/120,420

(22) Filed: Apr. 12, 2002

(65) Prior Publication Data

US 2003/0194124 A1 Oct. 16, 2003

(51) Int. Cl.[7] .................................................. G06K 9/62
(52) U.S. Cl. ........................ 382/156; 382/157; 382/130
(58) Field of Search ................................ 382/156, 157, 382/118, 261, 130, 131; 600/300

(56) References Cited

U.S. PATENT DOCUMENTS

| | | | | |
|---|---|---|---|---|
| 5,048,100 A | * | 9/1991 | Kuperstein | 382/157 |
| 5,642,431 A | * | 6/1997 | Poggio et al. | 382/118 |
| 5,713,364 A | * | 2/1998 | DeBaryshe et al. | 600/476 |
| 5,825,936 A | * | 10/1998 | Clarke et al. | 382/261 |
| 5,873,137 A | * | 2/1999 | Yavets-Chen | 5/713 |
| 6,084,981 A | | 7/2000 | Horiba et al. | 382/157 |

FOREIGN PATENT DOCUMENTS

| | | | | |
|---|---|---|---|---|
| JP | 404364449 A | * | 12/1992 | G01N/21/88 |
| JP | 411261814 A | * | 9/1999 | H04N/1/40 |

OTHER PUBLICATIONS

Zongquan, "Two–Level Classification of Target Recognition Based on Neural Network", IEEE International Conference on Mircrowave and Millimeter Wave Technology Proceedings, 8/1998, pps. 460–462.*

Neural Filter With Selection of Input Features And Its Application To Image Quality Improvement Of Medical Image Sequences, Kenji Suzuki et al., pp. 783–788; 2000 IEEE International Symposium on Intelligent Signal Processing and Communication Systems Nov. 5–8, 2000.

(List continued on next page.)

Primary Examiner—Anh Hong Do
(74) Attorney, Agent, or Firm—Oblon, Spivak, McClelland, Maier & Neustadt, P.C.

(57) ABSTRACT

A method of training an artificial neural network (ANN) involves receiving a likelihood distribution map as a teacher image, receiving a training image, moving a local window across sub-regions of the training image to obtain respective sub-region pixel sets, inputting the sub-region pixel sets to the ANN so that it provides output pixel values that are compared to output pixel values of corresponding teacher image pixel values to determine an error, and training the ANN to reduce the error. A method of detecting a target structure in an image involves scanning a local window across sub-regions of the image by moving the local window for each sub-region so as to obtain respective sub-region pixel sets, inputting the sub-region pixel sets to an ANN so that it provides respective output pixel values that represent likelihoods that respective image pixels are part of a target structure, the output pixel values collectively constituting a likelihood distribution map. Another method for detecting a target structure involves training N parallel ANNs on either (A) a same target structure and N mutually different non-target structures, or (B) a same non-target structure and N mutually different target structures, the ANNs outputting N respective indications of whether the image includes a target structure or a non-target structure, and combining the N indications to form a combined indication of whether the image includes a target structure or a non-target structure. The invention provides related apparatus and computer program products storing executable instructions to perform the methods.

84 Claims, 21 Drawing Sheets

OTHER PUBLICATIONS

A Recurrent Neural Filter For Reducing Noise In Medical X–Ray Image Sequences, Kenji Suzuki et al., pp. 157–160; The Fifth International Conference on Neural Information Processing; Oct. 21–23, 1998.

Neural Edge Detector—A Good Mimic Of Conventional One Yet Robuster Against Noise, Kenji Suzuki et al., IWANN 2001, LNCS 2085, pp. 303–310, 2001.

A Simple Neural Network Pruning Algorithm With Application To Filter Synthesis, Kenji Suzuki et al., Neural Processing Letters 13: pp. 43–53, 2001.

Edge Detection From Noisy Images Using A Neural Edge Detector, Kenji Suzuki et al., pp. 487–496; of Proceedings of the 2000 IEEE Signal Processing Society Workshop.

Efficient Approximation Of A Neural Filter For Quantum Noise Removal In X–Ray Images, Kenji Suzuki et al., pp. 370–379; 1999 IEEE 370.

Extraction of the Contours of Left Ventricular Cavity, According with Those Traced by Medical Doctors, From Left Ventriculograms Using a Neural Edge Detector, Kenji Suzuki et al, Medical Imaging 2001: Image Processing, Proceedings of SPIE vol. 4322 (2001) © 2001 SPIE— 1605-7422/01 pp. 1284–1295.

Noise Deduction of Medical X–Ray Image Sequences Using A Neural Filter With Spatiotemporal Inputs, Kenji Suzuki et al. Proceedings Of The 1998 International Symposium On Noise Reduction For Imaging And Communication Systems, ISNIC–98, Nov. 10–12, 1998 Tokyo, Japan, Sanjo Conference Hall, The University of Tokyo, Kenji Suzuki et al., pp. 85–90.

* cited by examiner

MASSIVE TRAINING ARTIFICIAL NEURAL NETWORK (MTANN) FOR DETECTING ABNORMALITIES IN MEDICAL IMAGES

The present invention was made in part with U.S. Government support under USPHS Grant No. CA62625 and Army Grant No. DAMD 17-96-1-6228. The U.S Government may have certain rights to this invention.

BACKGROUND OF THE INVENTION

1. Field of the Invention

The invention relates generally to the field of computerized, automated assessment of medical images, and more particularly to methods, systems, and computer program products for computer-aided detection and computer-aided detection of abnormalities (such as lesions and lung nodules) in medical images (such as low-dose CT scans) using artificial intelligence techniques (such as artificial neural networks, ANNs).

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617;

as well as U.S. patent applications Ser. Nos. 08/173,935; 08/398,307 (PCT Publication WO 96/27846); Ser. Nos. 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 60/332,005; 60/331,995; and 60/354,523;

as well as co-pending U.S. patent applications (listed by attorney docket number) 215752US-730-730-20, 216439US-730-730-20, 218013US-730-730-20, and 218221US-730-730-20;

as well as PCT patent applications PCT/US98/15165; PCT/US98/24933; PCT/US99/03287; PCT/US00/41299; PCT/US01/00680; PCT/US01/01478 and PCT/US01/01479, all of which documents are incorporated herein by reference.

The present invention includes use of various technologies referenced and described in the above-noted U.S. Patents and Applications, as well as those described in the documents identified in the following List of References that are cited throughout the specification:

LIST OF REFERENCES CITED IN TEXT

1. R. T. Greenlee, M. B. Hill-Harmon, T. Murray, and M. Thun, "Cancer statistics, 2001," CA A Cancer Journal for Clinicians 51, 15–36 (2001).
2. R. T. Heelan, B. J. Flehinger, M. R. Melamed, M. B. Zaman, W. B. Perchick, J. F. Caravelli, and N. Martini, "Non-small-cell lung cancer: Results of the New York screening program," Radiology 151, 289–293 (1984).
3. S. Sone et al., "Mass screening for lung cancer with mobile spiral computed topography scanner," The Lancet 351, 1242–124 (1998).
4. M. Kaneko, K. Eguchi, H. Ohmatsu, R. Kakinuma, T. Naruke, K. Suemasu, and N. Moriyama, "Peripheral lung cancer: Screening and detection with low-dose spiral CT versus radiography," Radiology 201, 798–802 (1996).
5. C. I. Henschke et al., "Early Lung Cancer Action Project: Overall design and findings from baseline screening," The Lancet 354, 99–105 (1999).
6. J. W. Gurney, "Missed lung cancer at CT: Imaging findings in nine patients," Radiology 199, 117–122 (1996).
7. F. Li, S. Sone, H. Abe, H. MacMahon, S. G. Armato III, and K. Doi, "Missed lung cancers in low-dose helical CT screening program obtained from a general population," (submitted to Radiology 2002).
8. S. Yamamoto, I. Tanaka, M. Senda, Y. Tateno, T. Iinuma, T. Matsumoto, and M. Matsumoto, "Image processing for computer-aided diagnosis of lung cancer by CT (LDCT)," Systems and Computers in Japan 25, 67–80 (1994).
9. T. Okumura, T. Miwa, J. Kako, S. Yamamoto, M. Matsumoto, Y. Tateno, T. Iinuma, and T. Matsumoto, "Image processing for computer-aided diagnosis of lung cancer screening system by CT (LDCT)," In Proc. SPIE, 3338, 1314–1322 (1998).
10. W. J. Ryan, J. E. Reed, S. J. Swensen, and J. P. F. Sheedy, "Automatic detection of pulmonary nodules in CT," In Proc. Computer Assisted Radiology, pp. 385–389 (1996).
11. K. Kanazawa, M. Kubo, N. Niki, H. Satoh, H. Ohmatsu, K. Eguchi, and N. Moriyama, "Computer assisted lung cancer diagnosis based on helical images," In Image Analysis Applications and Computer Graphics: Proc. Int. Computer Science Conf., pp. 323–330 (1995).
12. M. L. Giger, K. T. Bae, and H. MacMahon, "Computerized detection of pulmonary nodules in computed tomography images," Investigative Radiology 29, 459–465 (1994).
13. S. G. Armato III, M. L. Giger, J. T. Blackbur, K. Doi, and H. MacMahon, "Three-dimensional approach to lung nodule detection in helical CT," In Proc. SPIE, 3661, 553–559 (1999).
14. S. G. Armato III, M. L. Giger, C. J. Moran, J. T. Blackbur, K. Doi, and H. MacMahon, "Computerized detection of pulmonary nodules on CT scans," Radiographics 19, 1303–1311 (1999).
15. S. G. Armato III, M. L. Giger, and H. MacMahon, "Analysis of a three-dimensional lung nodule detection method for thoracic CT scans," In Proc. SPIE, 3979, 103–109 (2000).
16. S. G. Armato III, M. L. Giger, and H. MacMahon, "Automated detection of lung nodules in CT scans: Preliminary results," Medical Physics 28, 1552–1561 (2001).
17. J. P. Ko and M. Betke, "Automated nodule detection and assessment of change over time-preliminary experience," Radiology 218, 267–273 (2001).
18. S. Sone, F. Li, Z.-G. Yang, S. Takashima, Y. Maruyama, M. Hasagawa, J.-C. Wang, S. Kawakami, and T. Honda, "Results of three-year mass screening programme for lung cancer using mobile low-dose spiral computed tomography scanner," British Journal of Cancer 84, 25–32 (2001).
19. S. R. Sternberg, "Grayscale morphology," Computer Vision, Graphics, and Image Processing 35, 333–355 (1986).
20. J. H. M. Austin, N. L. Muller, P. J. Friedman, D. M. Hansell, D. P. Naidich, M. Remy-Jardin, W. R. Webb, and E. A. Zerhouni, "Glossary of terms for CT of the lungs: Recommendations of the nomenclature committee of the Fleischner Society," Radiology 200, 327–331 (1996).

21. S. G. Armato III, F. Li, M. L. Giger, H. MacMahon, S. Sone, and K. Doi, "Performance of automated CT nodule detection on missed cancers from a lung cancer screening program," (submitted to Radiology 2002).

22. K. Arakawa and H. Harashima, "A nonlinear digital filter using mufti-layered neural networks," In Proc. IEEE Int. Conf. Communications, 2, 424–428 (1990).

23. L. Yin, J. Astola, and Y. Neuvo, "A new class of nonlinear filters—neural filters," IEEE Trans. Signal Processing 41, 1201–1222 (1993).

24. L. Yin, J. Astola, and Y. Neuvo, "Adaptive multistage weighted order statistic filters based on the back propagation algorithm," IEEE Trans. Signal Processing 42, 419–422 (1994).

25. H. Hanek and N. Ansari, "Speeding up the generalized adaptive neural filters," IEEE Trans. Image Processing 5, 705–712 (1996).

26. K. Suzuki, I. Horiba, N. Sugie, and M. Nanki, "A recurrent neural filter for reducing noise in medical X-ray image sequences," In Proc. Int. Conf. Neural Information Processing, 1, 157–160 (1998).

27. K. Suzuki, I. Horiba, N. Sugie, and M. Nanki, "Noise reduction of medical X-ray image sequences using a neural filter with spatiotemporal inputs," In Proc. Int. Symp. Noise Reduction for Imaging and Communication Systems, pp. 85–90 (1998).

28. K. Suzuki, I. Horiba, and N. Sugie, "Training under achievement quotient criterion," In Neural Networks for Signal Processing X, pp. 537–546 (IEEE Press, Piscataway, N.J., 2000).

29. K. Suzuki, I. Horiba, and N. Sugie, "Signal-preserving training for neural networks for signal processing," In Proc. IEEE Int. Symp. Intelligent Signal Processing and Communication Systems, 1, 292–297 (2000).

30. K. Suzuki, I. Horiba, and N. Sugie, "Neural filter with selection of input features and its application to image quality improvement of medical image sequences," In Proc. IEEE Int. Symp. Intelligent Signal Processing and Communication Systems, 2, 783–788 (2000).

31. K. Suzuki, I. Horiba, and N. Sugie, "Efficient approximation of a neural filter for quantum noise removal in X-ray images," (to be published in) IEEE Trans. Signal Processing 50 (2002).

32. I. Horiba, K. Suzuki, and T. Hayashi, "Image processing apparatus for performing image converting process by neural network," U.S. Pat. No. 6,084,981 (filed in 1996).

33. K. Suzuki, I. Horiba, and N. Sugie, "Edge detection from noisy images using a neural edge detector," In Neural Networks for Signal Processing X, pp. 487–496 (IEEE Press, Piscataway, N.J., 2000).

34. K. Suzuki, I. Horiba, and N. Sugie, "Neural edge detector -a good mimic of conventional one yet robuster against noise-," Lecture Notes in Computer Science, Bio-Inspired Applications of Connectionism 2085, 303–310 (2001).

35. K. Suzuki, I. Horiba, N. Sugie, and M. Nanki, "Extraction of the contours of left ventricular cavity, according with those traced by medical doctors, from left ventriculograms using a neural edge detector," In Proc. SPIE, 4322, 1284–1295 (2001).

36. K. Suzuki, I. Horiba, N. Sugie, and M. Nanki, "Contour extraction of the left ventricular cavity from digital subtraction angiograms using a neural edge detector," (to be published in) Systems and Computers in Japan 33 (2002).

37. K. Suzuki, I. Horiba, K. Ikegaya, and M. Nanki, "Recognition of coronary arterial stenosis using neural network on DSA system," Systems and Computers in Japan 26, 66–74 (1995).

38. K. Suzuki, I. Horiba, N. Sugie, and M. Nanki, "Computer-aided diagnosis system for coronary artery stenosis using a neural network," In Proc. SPIE, 4322, 1771–1782 (2001).

39. K. Funahashi, "On the approximate realization of continuous mappings by neural networks," Neural Networks 2, 183–192 (1989).

40. A. R. Barron, "Universal approximation bounds for superpositions of a sigmoidal function," IEEE Trans. Information Theory 39, 930–945 (1993).

41. D. E. Rumelhart, G. E. Hinton, and R. J. Williams, "Learning representations of back-propagation errors," Nature 323, 533–536 (1986).

42. D. E. Rumelhart, G. E. Hinton, and R. J. Williams, in Learning internal representations by error propagation, Vol. 1 of Parallel Distributed Processing (MIT Press, MA, 1986), Chap. 8, pp. 318–362.

43. K. Suzuki, I. Horiba, and N. Sugie, "Designing the optimal structure of a neural Filter," In Neural Networks for Signal Processing VIII, pp. 323–332 (IEEE Press, Piscataway, N.J., 1998).

44. K. Suzuki, I. Horiba, and N. Sugie, "A simple neural network pruning algorithm with application to filter synthesis," Neural Processing Letters 13, 43–53 (2001).

45. K. Suzuki, I. Horiba, and N. Sugie, "Simple unit-pruning with gain-changing training," In Neural Networks for Signal Processing XI, pp. 153–162 (IEEE Press, Piscataway, N.J., 2001).

46. D. P. Chakraborty and L. H. L. Winter, "Free-response methodology: Alternate analysis and a new observer-performance experiment," Radiology 174, 873–881 (1990).

47. C. E. Metz, "ROC methodology in radiologic imaging," Invest. Radiology 21, 720–733 (1986).

48. C. E. Metz, B. A. Herman, and J.-H. Shen, "Maximum likelihood estimation of receiver operating characteristic (ROC) curves from continuously-distributed data," Stat. Med. 17, 1033–1053 (1998).

49. J. A. Hanley and B. J. McNeil, "A method of comparing the areas under receiver operating characteristic curves derived from the same cases," Radiology 148, 839–843 (1983).

50. S. Haykin, Neural Networks—a comprehensive foundation, 2nd ed. (Prentice-Hall, Upper Saddle River, N.J., 1999).

51. W. Zhang, K. Doi, M. L. Giger, Y. Wu, R. M. Nishikawa, and R. A. Schmidt, "Computerized detection of clustered microcalcifications in digital mammograms using a shift-invariant artificial neural network," Medical Physics 21, 517–524 (1994).

52. H.-P. Chan, S.-C. B. Lo, and B. Sahiner, "Computer-aided detection of mammographic microcalcifications: pattern recognition with an artificial neural network," Medical Physics 22, 1555–1567 (1995).

53. S.-C. B. Lo, H.-P. Chan, J.-S. Lin, H. Li, M. T. Freedman, and S. K. Mun, "Artificial convolution neural network for medical image pattern recognition," Neural Networks 8, 1201–1214 (1995).

54. W. Zhang, K. Doi, M. L. Giger, R. M. Nishikawa, and R. A. Schmidt, "An improved shift-invariant artificial neural network for computerized detection of clustered microcalcifications in digital mammograms," Medical Physics 23, 595–601 (1996).

55. B. Sahiner, H.-P. Chan, N. Petrick, D. Wei, M. A. Helvie, D. D. Adler, and M. M. Goodsitt, "Classification of mass and normal breast tissue: A convolution neural network classifier with spatial domain and texture images," IEEE Trans. on Medical Imaging 15, 598–610 (1996).

56. M. N. Gurcan, B. Sahiner, H.-P. Chan, L. Hadjiiski, and N. Petrick, "Selection of an optimal neural network architecture for computer-aided detection of microcalcifications-Comparison of automated optimization techniques," Medical Physics 28, 1937–1948 (2001).

The contents of each of these references, including patents and patent applications, are incorporated herein by reference. The techniques disclosed in the patents, patent applications and other references can be utilized as part of the present invention.

DISCUSSION OF THE BACKGROUND

Lung cancer continues to rank as the leading cause of cancer death among Americans and has expected to cause 157,400 deaths in the United States in 2001 (Ref. 1). Some evidence suggests that early detection of lung cancer may allow more timely therapeutic intervention and thus a more favorable prognosis for the patient (Refs. 2, 3). The sensitivity of helical computed tomography (CT) for lung nodule detection is significantly superior to that of conventional CT. Accordingly, screening programs for lung cancer with low-dose helical CT have been carried out in the United States and Japan (Refs. 4, 5). With helical CT, a number of CT images are acquired during a single CT examination.

Radiologists have to read many CT images. This may lead to "information overload" for the radiologists. Furthermore, radiologists may miss many cancers during interpretation of CT images in a lung cancer screenings (Refs. 6, 7). Therefore, a computer-aided diagnosis (CAD) scheme for detection of lung nodules in low-dose CT images has been investigated as a useful tool for lung cancer screening.

Many investigators have developed a number of methods for the automated detection of lung nodules in CT scans, based on morphological filtering (Refs. 8, 9), geometric modeling (Ref. 10), fuzzy clustering (Ref. 11), and gray-level thresholding (Refs. 12–17). Giger et al. (Ref. 12) developed an automated detection scheme based on multiple gray-level thresholding and geometric feature analysis. Armato et al. (Refs. 13–16) extended the method to include a three-dimensional approach and linear discriminant analysis.

A major problem with certain known CAD schemes for lung nodule detection is a relatively large number of false positives, which cause difficulty in the clinical application of the CAD scheme. A large number of false positives are likely to disturb the radiologist's task in lung nodule detection and interpretation, thus lowering the efficiency of the radiologist's task with the CAD scheme. In addition, radiologists may lose their confidence in using the CAD scheme. Therefore, it is very important to reduce the number of false positives as much as possible, while maintaining a high sensitivity.

A database used in a study discussed throughout this specification included 38 non-infused, low-dose thoracic helical CT (LDCT) scans acquired from 31 different patients who participated voluntarily in a lung cancer screening program between 1996 and 1998 in Nagano, Japan (Refs. 3, 18, 7). The CT examinations were performed on a mobile CT scanner (CT-W950SR; Hitachi Medical, Tokyo, Japan). The scans used for this study were acquired with a low-dose protocol of 120 kVp, 25 mA (11) or 50 mA (27 scans), 10-mm collimation, and a 10-mm reconstruction interval at a helical pitch of two (Ref 18). The pixel size was 0.586 mm for 33 scans and 0.684 mm for five scans. Each reconstructed CT section had an image matrix size of 512×512 pixels. The 38 scans consisted of 1057 sections, and included 38 "missed" nodules that represent biopsy-confirmed lung cancers and were not reported during the initial clinical interpretation (Ref. 7).

Technical details of a known scheme have been published previously in Refs 13–16, in which lung nodule identification proceeds in three phases: two-dimensional (2D) processing, followed by three-dimensional (3D) analysis, and then the application of classifiers. A gray-level thresholding technique is applied to a 2D section of a CT scan for automated lung segmentation. Modifications to the resulting lung segmentation regions are made by use of a rolling-ball technique (Refs. 19, 8) that eliminates the trachea and main-stem bronchi when they are erroneously included within the lung regions.

A multiple gray-level-thresholding technique is applied to the segmented lung volume. Individual structures are identified by grouping of spatially contiguous pixels that remain in the volume at each of 36 gray-level thresholds. Because a nodule is defined radiologically as any well-demarcated, soft-tissue focal opacity with a diameter less than 3 cm (Ref. 20), a structure is identified as a nodule candidate if the volume of the structure is less than that of a 3-cm-diameter sphere.

The categorization of nodule candidates as "nodule" or "non-nodule" is based on a combination of a rule-based classifier and a series of two linear discriminant classifiers applied to a set of nine 2D and 3D features extracted from each nodule candidate. The features are 3D gray-level-based features, 3D morphological features, and 2D morphological features: (1) the mean gray level of the candidate, (2) the gray-level standard deviation, (3) the gray-level threshold at which the candidate was identified, (4) volume, (5) sphericity, (6) radius of the sphere of equivalent volume, (7) eccentricity, (8) circularity, and (9) compactness.

In this CAD scheme, the multiple gray-level-thresholding technique initially identified 20,743 nodule candidates in 1057 sections of LDCT images (Ref 7). Then a rule-based classifier followed by a series of two linear discriminant classifiers was applied for removal of some false positives, thus yielding a detection of 41 (82.0%) of 50 nodules together with 1,078 (28.4 per case and 1.02 per section) false positives (Ref. 21). In this study, all 50 nodules and all 1078 false positives were used; the 1078 false positives included in this evaluation were considered as "very difficult" false positives.

Recently, in the field of signal processing, nonlinear filters based on a multilayer artificial neural network (ANN), called neural filters, have been studied. In the neural filter, the multilayer ANN is employed as a convolution kernel. The neural filters can acquire the functions of various linear and nonlinear filters through training. It has been demonstrated that the neural filters can represent an averaging filter, weighted averaging filters, weighted median filters, morphological filters, microstatistic filters, generalized-weighted-order statistical filters, an epsilon filter, and generalized stack filters (Refs. 22–25). In the applications of the neural filters to reduction of the quantum mottle in X-ray fluoroscopic and radiographic images, it has been reported that the performance of the neural filter was superior to that of the nonlinear filters utilized in medical systems and a well-known nonlinear filter (Refs. 26–32). The performance of the neural filter was superior to that of the conventional nonlinear filters.

On the other hand, in the field of computer vision, a supervised edge detector based on a multilayer ANN, called a neural edge detector, has been developed (Refs. 33–36). The neural edge detector can acquire the function of a desired edge detector through training. It has been reported that the performance of the neural edge detector on edge detection from noisy images was far greater than that of the conventional edge detectors such as the Canny edge detector, the Marr-Hildreth edge detector, and the Huckel edge detector (Refs. 33, 34). In its application to the contour extraction of the left ventricular cavity in digital angiography, it has been reported that the neural edge detector can accurately detect the subjective edges traced by cardiologists (Refs. 35, 36).

SUMMARY OF THE INVENTION

First, the invention provides a method of training an artificial neural network including network parameters that govern how the artificial neural network operates, the method having the steps of receiving at least a likelihood distribution map as a teacher image; receiving at least a training image; moving a local window across plural sub-regions of the training image to obtain respective sub-region pixel sets; inputting the sub-region pixel sets to the artificial neural network so that the artificial neural network provides output pixel values; comparing the output pixel values to corresponding teacher image pixel values to determine an error; and training the network parameters of the artificial neural network to reduce the error.

Second, the invention provides a method of detecting a target structure in an image by using an artificial neural network, the method having the steps of scanning a local window across sub-regions of the image by moving the local window for each sub-region, so as to obtain respective sub-region pixel sets; inputting the sub-region pixel sets to the artificial neural network so that the artificial neural network provides, corresponding to the sub-regions, respective output pixel values that represent likelihoods that respective image pixels are part of a target structure, the output pixel values collectively constituting a likelihood distribution map; and scoring the likelihood distribution map to detect the target structure.

Third, the invention provides an apparatus for detecting a target structure in an image, the apparatus having a network configured to receive sub-region pixel sets from respective sub-regions of the image, and to operate on the sub-region pixel sets so as to produce a likelihood distribution map including output pixel values that represent likelihoods that corresponding image pixels are part of the target structure.

Fourth, the invention provides a method for detecting a target structure in an image, the method having the steps of training first through N-th artificial neural networks, N being an integer greater than 1, on either (A) a same target structure and first through N-th mutually different non-target structures, or (B) a same non-target structure and first through N-th mutually different target structures, the first through N-th artificial neural networks being configured to output first through N-th respective indications of whether the image includes a target structure or a non-target structure; and combining the first through N-th indications to form a combined indication of whether the image includes a target structure or a non-target structure.

Fifth, the invention provides an apparatus for detecting a target structure in an image, the apparatus having first through N-th artificial neural networks, N being an integer greater than 1, that have been trained on either (A) a same target structure and first through N-th mutually different non-target structures, or (B) a same non-target structure and first through N-th mutually different target structures, the first through N-th artificial neural networks being configured to output first through N-th respective indications of whether the image includes a target structure or a non-target structure; and a combiner configured to combine the first through N-th indications to form a combined indication of whether the medical image includes a target structure or a non-target structure.

The invention further provides various combinations of the foregoing methods and apparatus.

The invention further provides computer program products storing program instructions for execution on computer systems, which when executed by the computer systems, cause the computer system to perform the inventive method steps.

In particular embodiments and applications of the present invention to which the scope of the claims should not be limited, none, one or more of the following may apply:

the image may be a medical image;

the target structure may be an abnormality in the medical image;

the non-target structures may be normal anatomical structures in the medical image;

the network may be configured to receive sub-region pixel sets from respective consecutively physically overlapping sub-regions of the medical image that are displaced by a predetermined distance;

the predetermined distance may be a pixel pitch value in the medical image, so that successive sub-regions are offset from each other by a separation distance of adjacent pixels in the medical image; and/or the artificial neural network provides the respective output pixel values that represent the likelihoods that the respective medical image pixels are part of an abnormality.

Other objects, features and advantages of the invention will become apparent to those skilled in the art when reading the following Detailed Description with reference to the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which.

DETAILED DESCRIPTION OF THE PREFERRED EMBODIMENTS

Figure 1A:
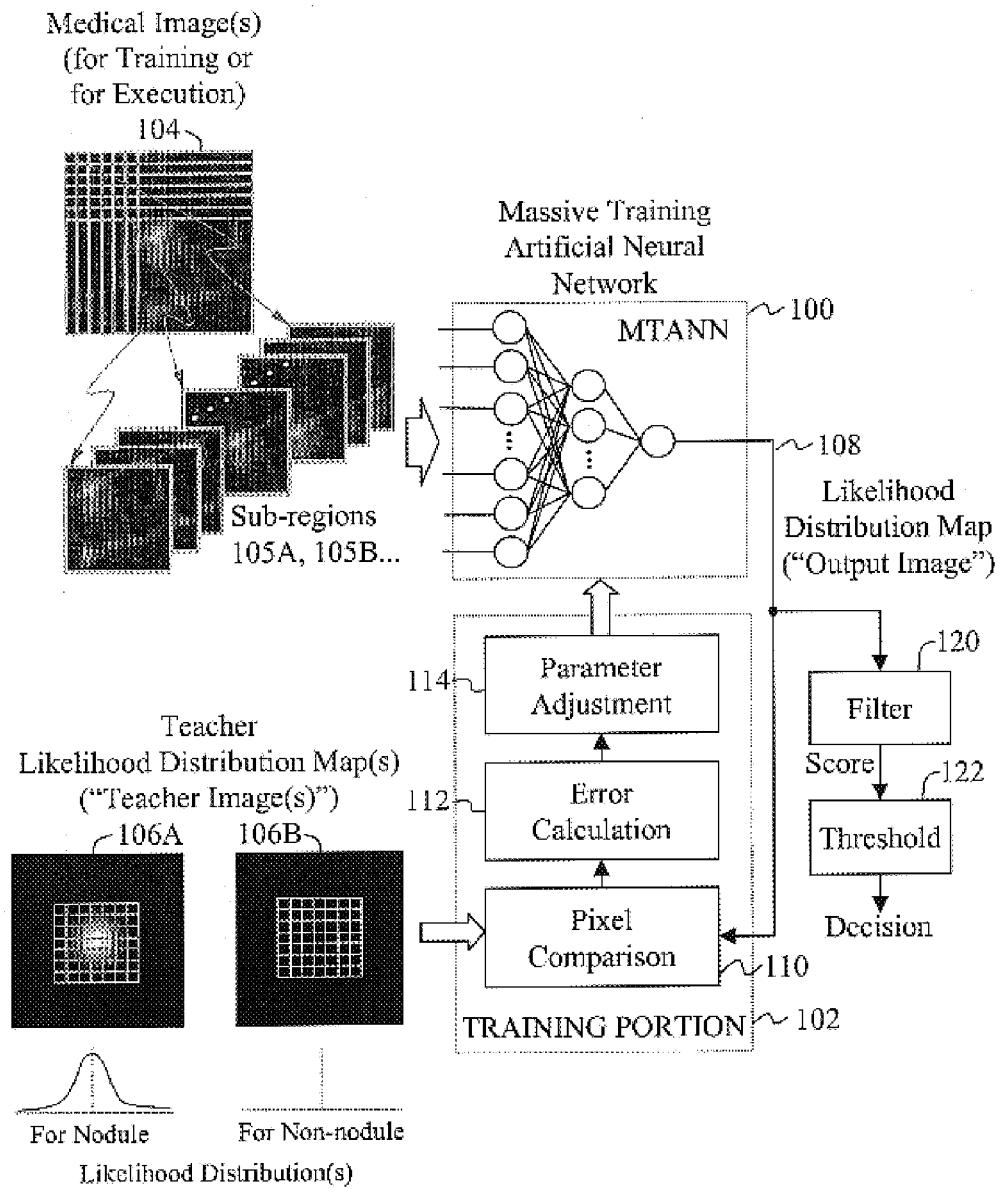
FIG. 1(a) illustrates an architecture of an exemplary massive training artificial neural network (MTANN) in conjunction with a training portion that trains the network by adjusting network parameters. (The training portion is sometimes considered to be part of the network itself.)

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Moreover, features and procedures whose implementations are well known to those skilled in the art, such as initiation and testing of loop variables in computer programming loops, are omitted for brevity.

The present invention provides various image-processing and pattern recognition techniques in arrangements that may be called a massive training artificial neural networks (MTANNs) and their extension, Multi-MTANNs. The invention is especially useful in reducing false positives in computerized detection of lung nodules in low-dose CT images. A preferred embodiment of the MTANN includes a modified multilayer ANN that can directly handle image pixels.

The exemplary MTANN is trained by use of input images together with the desired teacher images containing a distribution representing the likelihood of a particular pixel being a nodule (lesion). To achieve high performance, the MTANN is trained by using a large number of overlapping sub-regions that are obtained by dividing an original input image. The output image is obtained by scanning an input image with the MTANN: the MTANN acts like a convolution kernel of a filter. A nodule (abnormality) is distinguished from a non-nodule (normal anatomical structure) by a score defined from the output image of the trained MTANN.

FIG. 1(a) illustrates an architecture of an exemplary massive training artificial neural network (MTANN) 100 in conjunction with a training portion 102 that trains the network by adjusting network parameters. (The training portion is sometimes considered to be part of the network itself.) It is understood that the functions of the elements may be implemented in software on a general purpose computer, as well as in the hardware elements shown in FIG. 1(a).

Briefly, during the training phase, sub-regions 105A, 105B . . . of training medical images 104 are input to the MTANN 100 while one or more teacher likelihood distribution maps (loosely called "teacher images") 106A, 106B . . . (collectively, "106") are input to training portion 102. MTANN 100 outputs a likelihood distribution map (loosely called an "output image") 108. In block 110, training portion 102 compares the pixel values of the MTANN's likelihood distribution map 108 to the values of the pixels in teacher likelihood distribution map 106. Block 112 calculates errors between the pixels being compared, and block 114 adjusts MTANN parameter values to minimize the error.

The MTANN is preferably implemented using a three-layer artificial neural network (ANN). The number of layers is preferably at least three, because a two-layer ANN can solve only linear problems. A three-layer ANN structure (including one hidden layer) is a particularly preferred ANN structure because three-layer artificial neural networks can realize any continuous mapping (function). The links connecting the nodes in the artificial neural network need not be of any special design or arrangement; however, the network parameters, the weights or multipliers that characterize the links, are preferably adjusted during a network training phase as described in this specification.

During the operational (execution) phase, medical images 104 are input to the trained MTANN 100, which provides a likelihood distribution map (output image) 108. Filter 120 filters the MTANN's likelihood distribution map 108 to form a score that element 122 compares to a threshold in order to arrive at a decision.

Figure 1B:
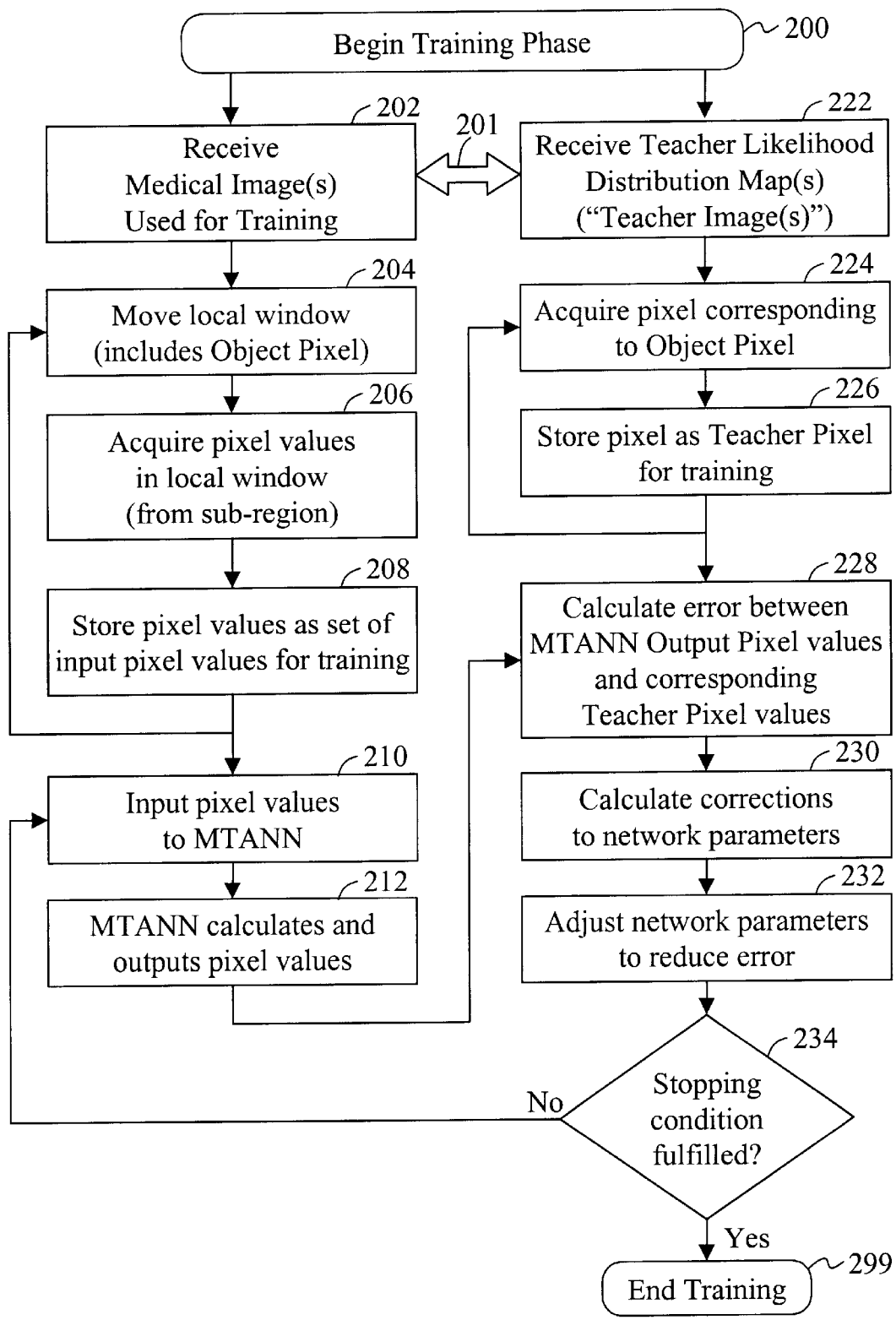
FIGS. 1(b), 1(c) and 1(d) illustrate two flow charts and a schematic block diagram of an MTANN's training phase, according to a preferred embodiment of the present invention. The block diagram of FIG. 1(d) adopts the convention that teacher images are "forced" into the outputs of the neural network in order to adjust network parameters; more literally the teacher images are input to a training portion (see FIG. 1 (a) element 102) that for simplicity is not illustrated in FIG. 1 (d).
Figure 1C:
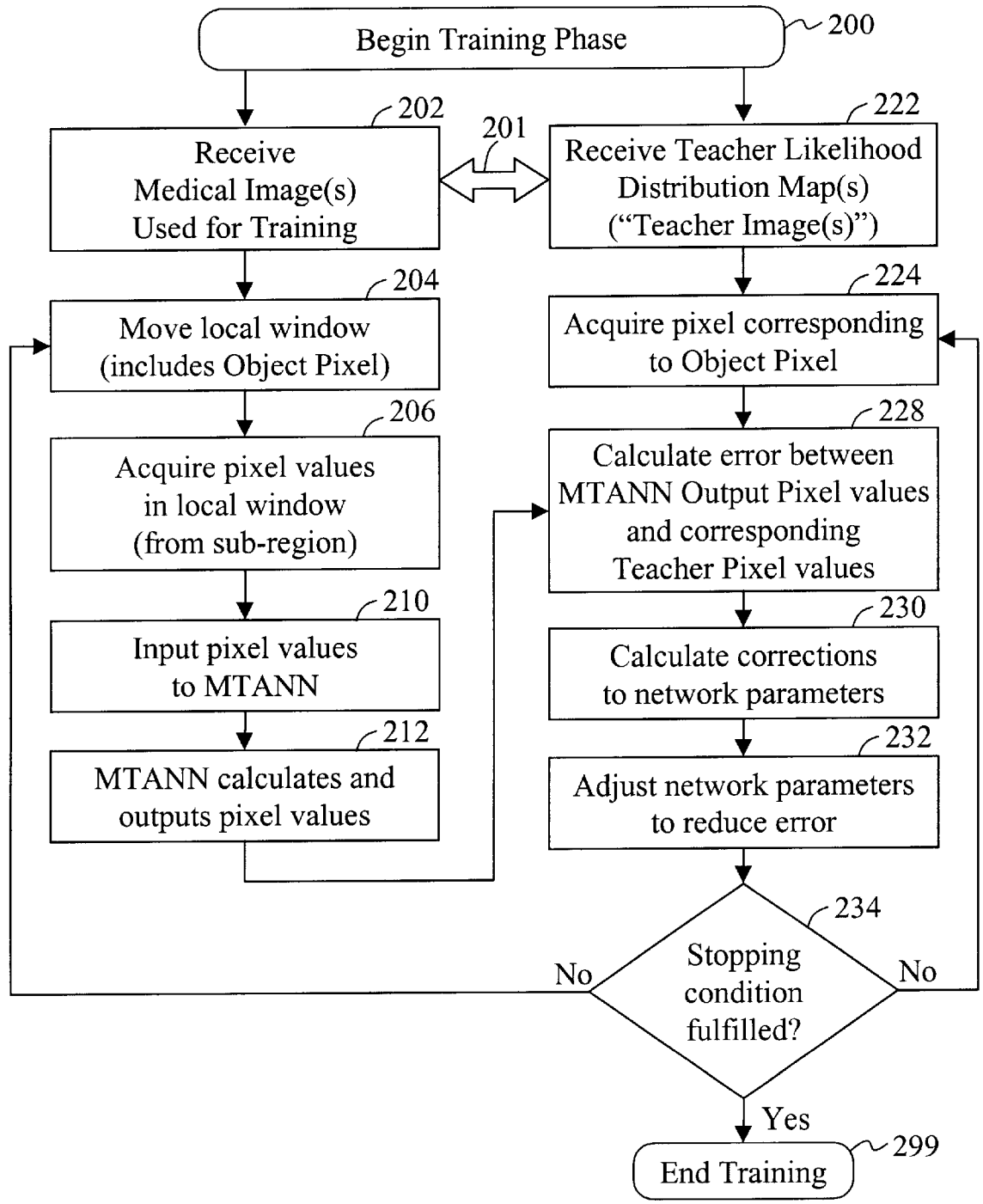
Figure 1D:
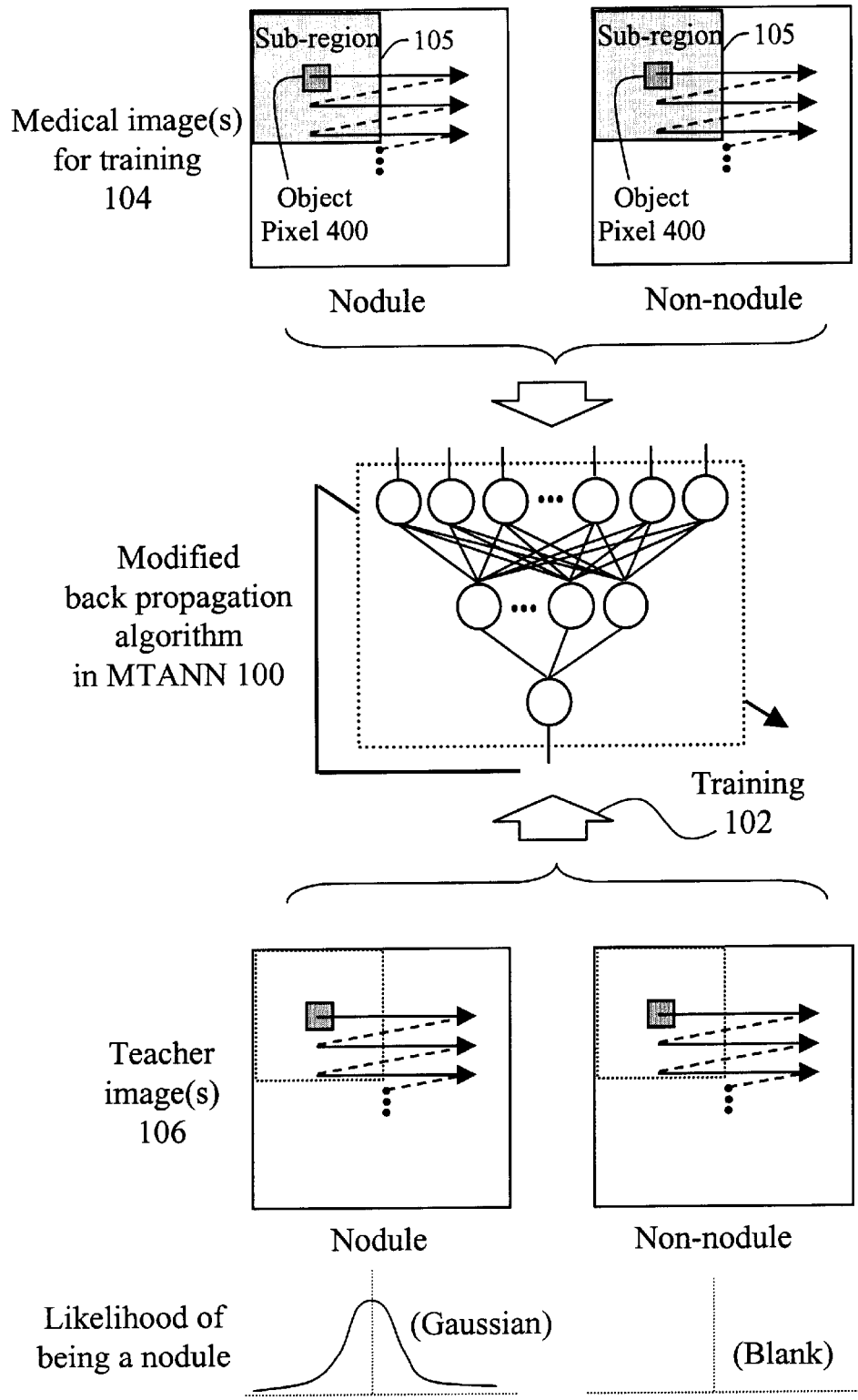

FIGS. 1(b), 1(c) and 1(d) illustrate two flow charts and a schematic block diagram of an MTANN's training phase, according to a preferred embodiment of the present invention. The block diagram of FIG. 1(d) adopts the convention that teacher images are "forced" into the outputs of the neural network to adjust network parameters; more literally the teacher images are input to a training portion 102 (see FIG. 1(a) element 102) that for simplicity is not illustrated in FIG. 1(d).

As briefly described above, MTANN 100 involves a training phase and an execution (or operational) phase. FIG. 1(a) illustrates elements that are used in either or both phases, with the understanding that elements and steps used in one phase need not necessarily be present or executed in the other phase. For example, the training portion 102 may be omitted from products that have already been trained and are merely desired to be used operationally (FIGS. 1(e), 1(f)). Conversely, filter 120 and threshold element 122 are not involved in the training phase (FIGS. 1(b), 1(c), 1(d)), but are discussed with reference to the execution (operational) phase.

Referring to the FIG. 1(b) flow chart in conjunction with the FIG. 1(a) block diagram, during a training phase, pixels from training medical images 104 are received in step 502. A given training medical image 104 may include an abnormality, no abnormalities, or set of both abnormalities and normal structures that are desired to be distinguished from abnormalities. The pixels of the training medical image are input to the MTANN in accordance with steps 204 through 208.

In step 204, a local window begins to scan across the training medical image. In step 204, the local window moves from one sub-region 105 (see FIG. 1(d)) of the training medical image to another, preferably one pixel distance at a time. A set of pixel values in the sub-region currently in the local window are acquired in step 206, and are stored in step 208. In the loop including steps 204 through 208, the local window scans across the rows of the training medical image in a manner shown in FIG. 1(d).

Sets of input pixel values that were stored in the loop 204-208 are then input to the MTANN in step 210, which calculates pixel values (step 212) in accordance with network parameters. Network parameters include, for example, multipliers in the links between neural network nodes. The calculated pixel values are output from the MTANN as an MTANN likelihood distribution map 108 (FIG. 1(a)).

The MTANN likelihood distribution map's pixels are calculated to be a likelihood that a corresponding "object pixel" 400 (see FIG. 1(d)) from the training medical image is part of an abnormality. The likelihood distribution map may be loosely referred to as an "output image" even though it is not strictly an image in the sense of a photograph of a structure. The description of the likelihood distribution map as an "image" is valid, inasmuch as its pixel values may be represented graphically to emphasize which parts of the original training medical image are abnormal and which parts are normal. For example, pixels that are more likely part of abnormalities can be made brighter and pixels that are less likely to be abnormalities can be made darker.

Referring again to FIG. 1(b), step 222 illustrates the reception of one or more teacher likelihood distribution maps (also called "teacher images"). As shown by broad bi-directional arrow 201, the teacher likelihood distribution maps 106 should correspond to the training medical images 104 discussed above, because the training process involves a progressively finer tuning of MTANN network parameters so that the MTANN 100 reliably recognizes the abnormalities that are known to exist in the training medical images.

In a preferred embodiment, training portion 102 receives a first teacher likelihood distribution map 106A (FIG. 1(a)) showing a distribution of pixel intensities representing the likelihood that that particular pixel is part of an abnormality. In a particular preferred embodiment, that distribution is likely to follow a two-dimensional Gaussian distribution pattern, preferably with a standard deviation proportional to a size of the abnormality. Further, training portion 102 receives a second teacher likelihood distribution map 106B (FIG. 1(a)) that is "blank" or "black," representing a distribution of pixel intensities when that particular pixel is not part of an abnormality.

In FIG. 1(b), the training portion iteratively acquires a pixel from the teacher likelihood distribution map(s) 106 that corresponds to a object pixel in the training medical image (step 224) and stores that pixel as a teacher pixel in preparation for a pixel comparison (step 226).

Step 228 involves comparison of pixel value differences (error) between (A) the likelihood distribution map 108 the MTANN in response to the training medical image 104, and (B) the teacher likelihood distribution map 106. This step is performed by comparison and error calculation blocks 110, 112 in training portion 102 of FIG. 1(a).

Step 230 shows the calculation of corrections to the MTANN's existing network parameters in order to minimize an error between the MTANN's output and the teacher map. Step 232 shows the application of the corrections to the existing network parameters so as to form adjusted network parameters. These two steps are performed by parameter adjustment block 114 in training portion 201 of FIG. 1(a).

Decision block 234 determines if a stopping condition for the training phase has been fulfilled. The stopping condition may involve a counting of a certain number of iterations of the training loop with respective medical images and teacher likelihood distribution maps. Alternatively, the stopping condition can involve stopping the training when error adjustments have been reduced to beneath a certain threshold, indicating that further training is unnecessary or even counter-productive.

If the stopping condition is not fulfilled, control returns to step 210 so that further sets of pixel values can be input to the MTANN. If the stopping condition is fulfilled, the training phase is ended (block 299), after which time the execution phase of FIGS. 1(e) and 1(f) may begin.

The flowchart of FIG. 1(c) illustrates an alternative embodiment of the training method shown in FIG. 1(b). The two methods differ in whether the MTANN processes a set of medical image pixels after an entire set is stored (FIG. 1(b)), or whether the MTANN processes the medical image pixels "on the fly" (FIG. 1(c)).

FIG. 1(c) avoids the need for FIG. 1(b)'s storage steps 208, 226. FIG. 1(c) also avoids FIG. 1(b)'s "tight" iterative loops 204/206/208 and 224/226. Instead, FIG. 1(c) executes a "wider" pair of loops "204/206/210/212+228/230/232" and "224+228/230/232." Otherwise, the steps that are common to the two training methods are essentially the same, and discussion of the common steps is not repeated.

Turning now to a description of the execution (operational) phase, the training portion 102 (FIG. 1(a)) is not active, or even not present. Also, the medical images 104 that are input to MTANN 100 are not training medical images with known and verified abnormalities, but generally are "new" medical images that have not been used to previously train the MTANN. However, filter element 120 and threshold element 122 are used during the execution phase.

Figure 1E:
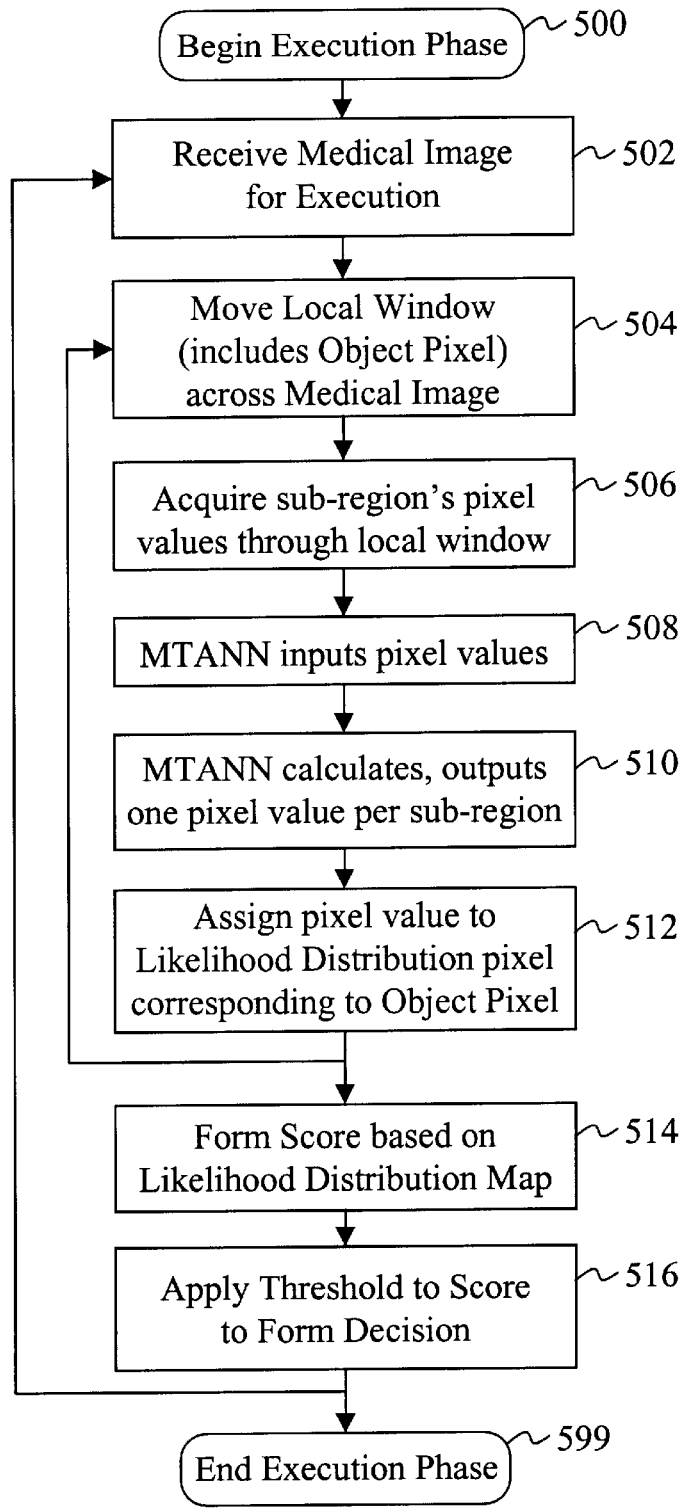
FIGS. 1(e) and 1(f) illustrate a flow chart and a schematic block diagram of an MTANN's execution (operational) phase, according to a preferred embodiment of the present invention.
Figure 1F:
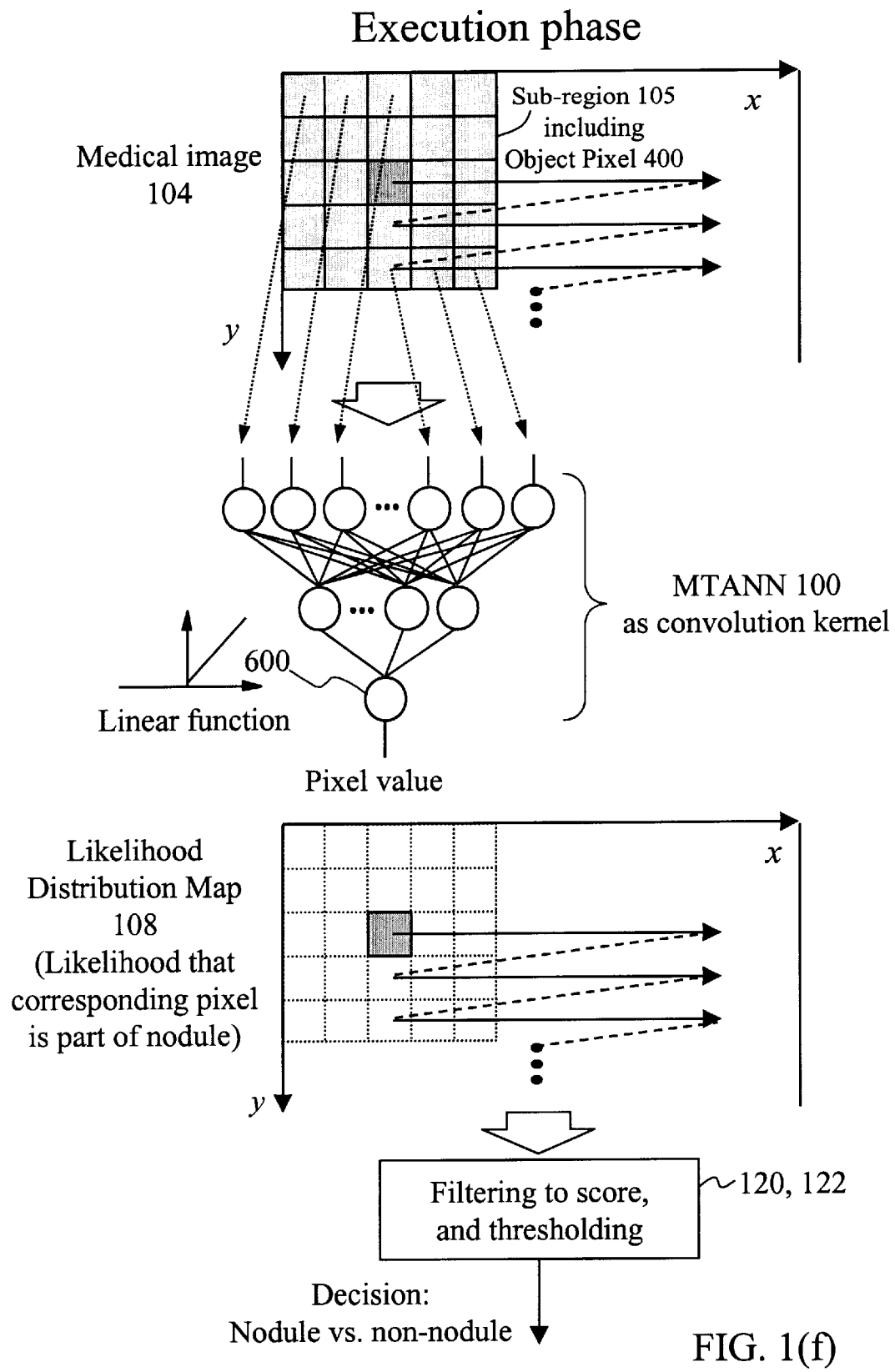

FIGS. 1(e) and 1(f) illustrate a flow chart and a schematic block diagram of an MTANN's execution (operational) phase, according to a preferred embodiment of the present invention.

Referring to the execution phase flow chart of FIG. 1(e), step 502 shows the reception of a medical image 104 for input to the MTANN 100. It is generally not known in advance whether structures in the medical image for execution contain abnormalities or merely normal structures.

A loop including steps 504, 506, 508, 510 and 512 correspond generally to steps 204, 206, 208, 210, and 212 of the training phase (FIG. 1(b)), except that the medical image that is being operated on is not a training medical image.

In FIG. 1(e), step 504 illustrates the moving of a local window from one sub-region of the medical image to a subsequent sub-region. The sub-regions have respective "object pixels" shown in FIGS. 1(d) and 1(f). Step 506 shows how sets of pixels from a present sub-region are acquired through the local window, and step 508 represents the input of those pixel sets to the MTANN. Step 510 shows that the MTANN calculates an output pixel value for each window location (sub-region), with step 512 assigning that pixel value to an output pixel location in an output likelihood distribution map that corresponds to the object pixel for that sub-region. The loop of steps 504 through 512 is repeated, with the local window iteratively moving from sub-region to sub-region, preferably one pixel's distance at a time, as shown in FIG. 1(f).

When the loop has been completed, the entire medical image (or all that is desired to be scanned) has been scanned. Control passes to step 514, which indicates how a filter 120 (FIG. 1(a)) filters the MTANN's likelihood distribution map 108 to arrive at a score. Finally, threshold block 122 compares a threshold value to the score to arrive at a decision concerning the detection of an abnormality in the medical image, as illustrated by step 516.

The foregoing procedure may be repeated for each medical image (or plural portions of a same medical image), as indicated by the return path from step 516 to step 502. When there is no more medical image information to be analyzed, the execution phase is completed (block 599).

The exemplary MTANN includes a modified multilayer ANN that can directly handle input gray levels and output gray levels. This embodiment is in contrast to many conventional ANNs, which commonly input image discretely-valued features as distinguished from continuous-valued image pixels. Many conventional ANNs are usually employed as a classifier that handles classes as distinguished from the gray levels that are handled by the inventive MTANN. Of course, the invention should not be limited to levels that are "gray" in the sense of being a shade between black and white; use of color pixels also lies within the contemplation of the present invention.

In the exemplary embodiment of the MTANN described herein, image processing or pattern recognition is treated as the convolution on an image with the modified ANN in which the activation functions of the units in the input, hidden, and output layers are a linear function, a sigmoid function, and a linear function, respectively.

In a particular preferred embodiment, the activation function of output layer 600 (FIG. 1(f)) is a linear function, as distinguished from step functions, the sign function or sigmoid functions. The choice of a linear function in the output layer comports with the feature of the invention, that the output of the artificial neural network is not a binary decision, class, diagnosis, or other discrete-value conclusion, but may constitute a continuous-value element such as a picture element of arbitrarily fine precision and resolution. Here, continuous-value means essentially means that a pixel may take on any of a variety of values so that a pixel is for practical purposes represented as an analog entity, even though it is recognized that digital computers have a finite number of bits allocated to represent entities such as pixels.

In a particular preferred embodiment analyzing low-dose CT scans and corresponding output images, a pixel is represented by 12 bits representing a gray scale tone. However, other degrees of precision and resolution, and multi-dimensional pixels such as color pixels, are also contemplated by the invention.

In contrast to the described embodiment, the activation function of output layer units of conventional ANNs is commonly a sigmoid function. However, a preferred embodiment of the invention employs a linear output unit activation function instead of a sigmoid function one because the characteristics of ANN are significantly improved in the application to the continuous mapping issues dealing with continuous values in image processing (Refs. 37, 38, 34), for example.

The basic architecture and operation of the embodiments of the MTANN having been described above, the following discussion provides more detail concerning the MTANN and certain explanations of its design. Of course, the scope of the claims should not be limited by particular applications of the invention or demonstrations of its success.

The pixel values of the original images are normalized first. The pixel values in a local window $R_s$ are input to the MTANN: the inputs to the MTANN are a normalized pixel value g(x, y) of an original image and spatially adjacent normalized pixel values. Although the most common use of a multilayer ANN is as a classifier that determines whether a certain pixel belongs to the class, such as normal or abnormal, the output of the MTANN is not a class, but a continuous value, which corresponds to the object pixel (for example, center pixel) in the local window, represented by $$f(x,y)=NN\{I(x,y)\}=NN\{g(x-i,y-j)/i,j \in R_s\} \quad \text{(Eqn. 1: Teacher Value)}$$

where:

f(x, y) denotes the estimate for the desired teacher value,
x and y are the indices of coordinates,
NN{·} is the output of the modified multilayer ANN,
I (x, y) is the input vector to the modified multilayer ANN,
g(x, y) is the normalized pixel value, and
$R_s$ is the local window of the modified multilayer ANN.

In a preferred embodiment, only one unit is employed in the output layer. The desired teacher values and thus the outputs of the MTANN are changed according to the application; when the task is distinguishing nodules from non-nodules, the output represents the likelihood that a given output pixel is part of a nodule.

All pixels in an image may be input by scanning the entire image with the MTANN. The MTANN, therefore, functions like a convolution kernel of a filter. In a particular preferred embodiment, the local window of the MTANN is shifted one pixel's distance at a time to cover successive sub-regions of the input image.

The MTANN is trained so that the input images are converted to the desired teacher images. The MTANN may be trained in the following manner.

In order to learn the relationship between the input image and the desired teacher image, the MTANN is trained with a set of input images and the desired teacher images by changing of the weights between the layers. The error E to be minimized by training is defined by:

$$E = \frac{1}{2P}\sum_p \{T^{(p)} - f^{(p)}\}^2 \quad \text{(Eqn. 2: Error)}$$

where:

p is a training pixel number,
$T^{(p)}$ is the p-th training pixel in the teacher images,
$f^{(p)}$ is the p-th training pixel in the output images, and
P is the number of training pixels.

The MTANN may be trained by any suitable technique known to those in the art. In one embodiment, a modified back-propagation algorithm of Ref. 37 may be derived for the arrangement described above, in the same way as the standard back-propagation algorithm of Refs. 41, 42. In this embodiment, the weight correction $\Delta W$ of the weight W between the m-th unit in the hidden layer and the unit in the output layer O is represented by:

$$\Delta W_m^O = -\eta \cdot \delta \cdot O_m^H = -\eta(T-f)O_m^H \quad \text{(Eqn. 3: Weight Correction)}$$

where:

$\delta$ is a delta value that may be computed, for example, as in Refs. 41, 42, and may be represented by:

$$\delta = \frac{\partial E}{\partial X} = \frac{\partial E}{\partial f_L}\frac{\partial f_L}{\partial X}$$

$f_L$ is an activation function of the unit in the output layer (according to the preferred embodiment of the invention, preferably a linear function),
X is the input value to the activation function,
$\eta$ is the learning rate, and
$O_m^H$ denotes the output (O) of the m-th unit in the hidden (H) layer.

By use of the delta, the corrections of any weights can be derived in the same way as the derivation of the back-propagation algorithm.

For distinguishing between nodules and non-nodules, the desired teacher image contains a distribution representing the likelihood of being a nodule. That is, a teacher image for nodules should contain a certain distribution, the peak of which is located at the center of the nodule; and that for non-nodules should contain zero. As the distance increases from the center of the nodule, the likelihood of being a nodule decreases; therefore, a two-dimensional Gaussian function with standard deviation $\sigma_T$ at the center of the nodule is used as the distribution representing the likelihood of being a nodule, where $\sigma_T$ may be determined as a measure representing the size of a nodule.

FIG. 1 illustrates the training for one nodule image. First, the image displaying a nodule at the center is divided into a large number of overlapping sub-regions. The consecutively adjacent sub-regions in the input image differ just by a pixel's separation distance. In other words, a sub-region overlaps with and differs by one pixel's separation distance from four adjacent sub-regions. The size of the sub-region corresponds to that of the local window $R_s$ of the MTANN.

All pixel values in each of the sub-regions are input to the MTANN. However, only one pixel in the teacher image is selected at the location in proportion to the displacement (or shift) of the central pixel in the input sub-region, and is entered into the output unit in the MTANN as the teacher value. By presenting each of the input sub-regions together with each of the teacher values, the MTANN is trained. The training set {I}, {T} for each nodule or non-nodule image may be represented by the following equations:

$$\{I_{s1}, I_{s2}, \ldots, I_{sp}, \ldots, I_{sNT}\}=\{I_s(x-i,y-j)|i,j \in R_T\}$$
$$\{T_{s1}, T_{s2}, \ldots, T_{sp}, \ldots, T_{sNT}\}=\{T_s(x-i,y-j)$$
$$|i,j \in R_T\} \quad \text{(Eqn. 4: Training Set)}$$

where:

s is the image (case) number,
$R_T$ is the training region,
$N_T$ is the number of pixels in $R_T$, and
$T_s(x, y)$ is the teacher image.

Thus, a large number of input sub-regions overlap each other, and the corresponding teacher values in the teacher image are used for training. The MTANN is trained with massive training samples to achieve high generalization ability.

The MTANN is robust against variation in patterns, especially shifting of patterns, because it is trained with numerous shifted patterns. The MTANN learns the essential features for nodules without the dependence on shifted locations.

After training, the MTANN outputs the highest value when a nodule is located at the center of the input region of the MTANN, a lower value as the distance increases from the center, and zero when the input region is a non-nodule.

The preferred embodiment of the output filter forms a score in the following manner.

When an original image for the $s^{th}$ case is entered into the trained MTANN for testing, the output image for the $s^{th}$ case is obtained by scanning of the original image with the trained MTANN. A nodule is distinguished from a non-nodule by a score S defined from the output image of the trained MTANN:

$$S_s = \sum_{x,y \in R_E} f_G(\sigma; x, y) \times f_s(x, y) \quad \text{(Eqn. 5: Score of output image)}$$

where:

$S_s$ is the score for the $s^{th}$ case, $R_E$ is the region for evaluation, $f_s(x, y)$ is the output image for the $s^{th}$ case, x is arithmetic multiplication, and $f_G$ ($\sigma$; x, y ) is a two-dimensional Gaussian function with standard deviation $\sigma$.

This score represents the weighted sum of the estimate for the likelihood of being a nodule near the center, i.e., a higher score indicates a nodule, and a lower score indicates a non-nodule. Other methods for determining a score can be employed. For example, the score may be calculated by averaging pixel values in the region $R_E$ in the output image of the MTANN.

Results of a study for a particular application of the MTANN are presented as follows.

The database used in this experiment consisted of 1057 LDCT images (512×512 pixels) obtained from 38 scans, which included 50 nodules.

Figure 2A:
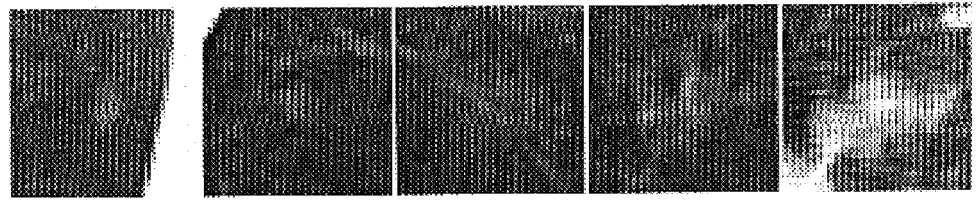
FIGS. 2(a) and 2(b) show, respectively, examples of nodules and non-nodules used as training cases for training an actual embodiment of the inventive MTANN.
Figure 2B:
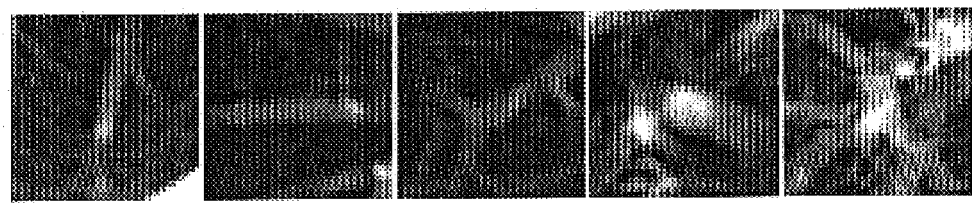

Ten nodules and ten false positives were used as the training cases for the MTANN. Examples of the training cases with the region of 40 by 40 pixels are shown in FIG. 2. Typical nodules included a pure ground-glass opacity (pure GGO; 40% of nodules in the database), solid nodule (32%), and mixed GGO (28%), and also dominant false positives such as medium-size vessels and peripheral vessels from the false positives reported by the known CAD scheme.

The majority of false positives can be classified as peripheral vessels (40% of false positives), medium-size vessels (30%), soft-tissue opacities including the opacities caused by the partial volume effect between the lung region and the diaphragm (20%), and part of normal structures in the mediastinum, including large vessels in the hilum (10%).

A three-layer ANN structure may be employed in the modified multilayer ANN, because any continuous mapping can be approximately realized by three-layer ANNs (Refs. 39, 40).

The local window of the MTANN may be selected to be nine by nine pixels. The number of units in the hidden layer was 25 initially. Thus, the numbers of units in the input, hidden, and output layers were 81, 25, and 1, respectively.

The standard deviation of the two-dimensional Gaussian function was determined as 5.0 pixels, which corresponds to the average effective diameter of the nodules.

The matrix size of the training region was select to be 19 by 19 pixels.

The input CT images were normalized such that −1000 HU (Hounsfield units) is zero and 1000 HU is one.

With the parameters above, the training of the MTANN was performed on 500,000 epochs. One epoch means one training run for one training set. The training converged with a mean absolute error of 11.2%. The training took 29.8 hours on a PC-based workstation (CPU: Pentium IV, 1.7 GHz), and the time for applying the trained MTANN to nodule candidates was negligibly small.

After training, a method for designing an ANN (see Refs. 43–45) was applied to the trained MTANN.

The redundant units in the hidden layer were removed on the basis of the effect of removing each unit on the training error, and then the MTANN was retrained to recover the potential loss due to the removal. Each process was performed alternately, resulting in a reduced architecture in which redundant units were removed. As a result, the optimal number of units in the hidden layer was determined as 22 units.

Figure 3A:
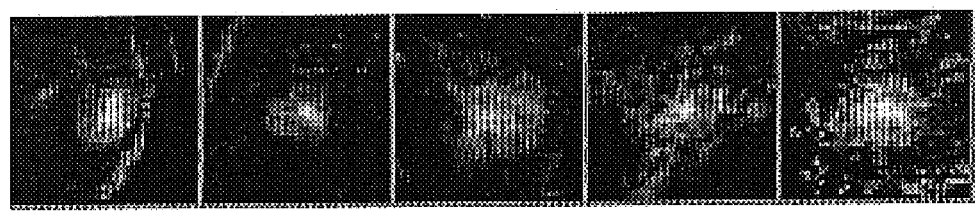
FIGS. 3(a) and 3(b) show output images of an embodiment of the MTANN for nodule candidates of the nodules and non-nodules, respectively, shown in FIGS. 2(a) and 2(b), in training cases; the images illustrate results obtained with a consistency test.
Figure 3B:
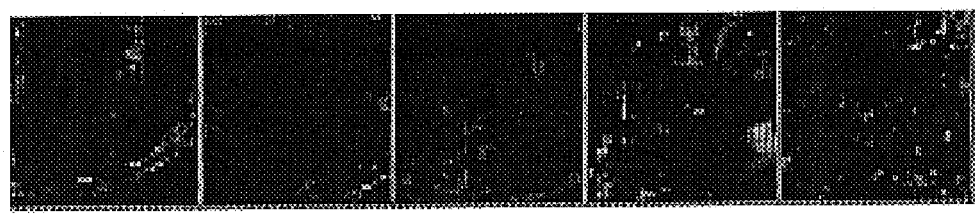

The results of applying the trained MTANN to nodule candidates in training cases, which corresponds to a consistency test, are shown in FIG. 3. Before applying the trained MTANN, regions outside the lung regions reported by the lung segmentation algorithm of a known scheme for lung nodule detection (Refs. 13–16) were set to −1000 HU. The nodules in the output image of the MTANN are represented by light distributions near the center, whereas the output images for false positives (non-nodules) are almost dark.

It is apparent that the distinction between nodules and non-nodules in the output images of the MTANN is superior to that in the original images. Therefore, the MTANN learns important features related to the input images and the teacher images.

The trained MTANN was applied to nodule candidates in all of the 1068 non-training test cases for a validation test. The execution time was very short: only 1.4 seconds for 1000 nodule candidates.

Figure 4A:
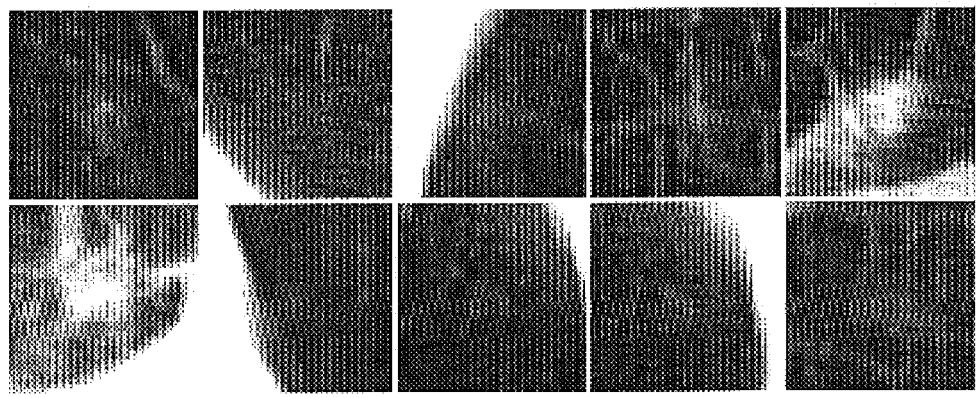
FIGS. 4(a) and 4(b) illustrate, respectively, ten nodules and ten corresponding output images of the embodiment of the MTANN, for non-training cases in a validation test.
Figure 4B:
Figure 5A:
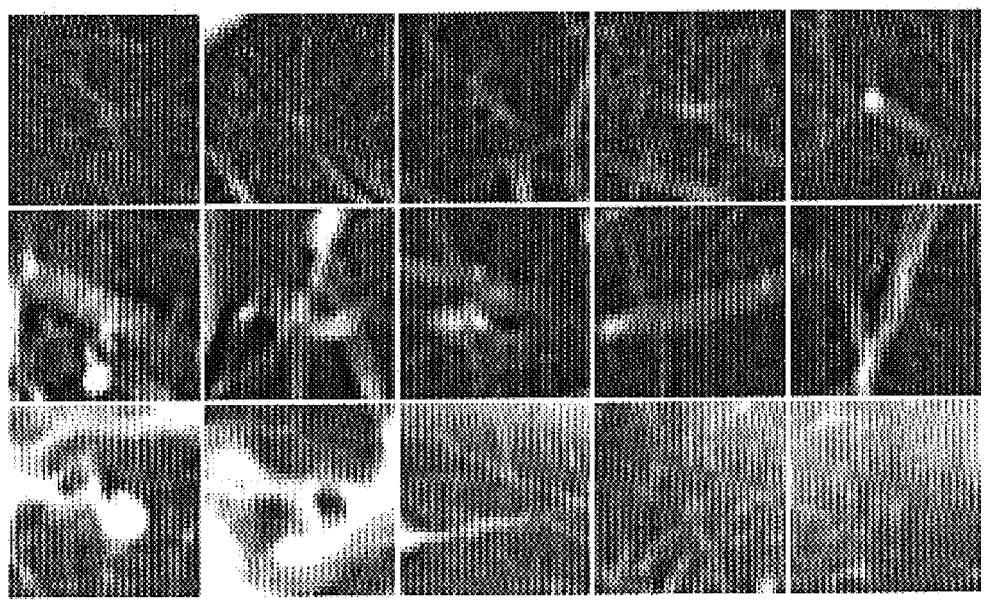
FIGS. 5(a) and 5(b) illustrate, respectively, fifteen false-positives (non-nodules) and fifteen corresponding output images of an embodiment of the MTANN, for non-training cases in a validation test. The top, second, and third row show typical examples of peripheral vessels, medium-size vessels, and part of normal structure and soft-tissue opacities, respectively. In the third row, the first two images are large vessels of the hilum, the trachea, and the bronchi; the last three images are opacities caused by the partial volume effect between the lung region, including pulmonary vessels and soft tissue.
Figure 5B:
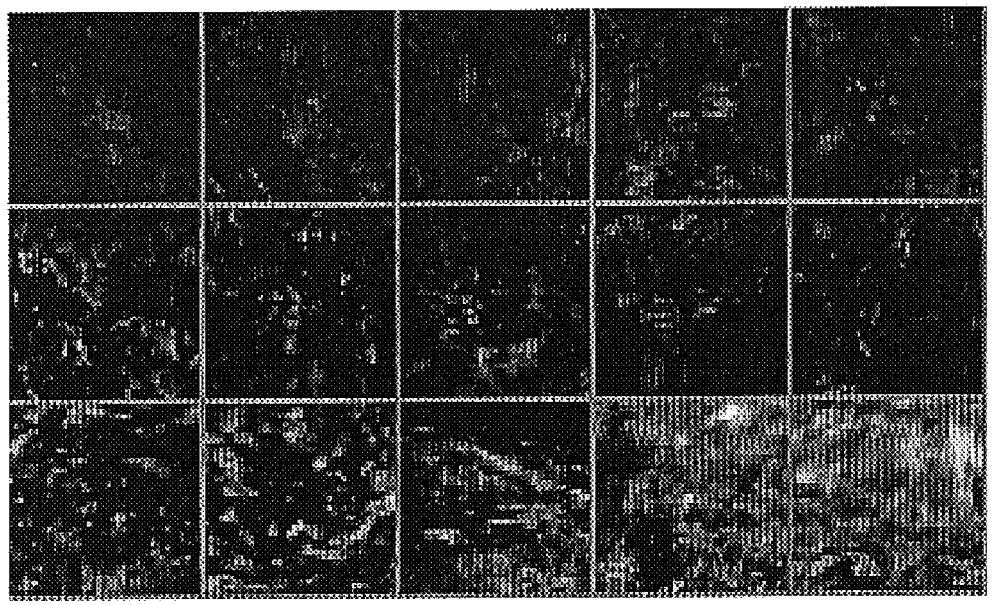

The results for non-training cases in the validation test are shown in FIGS. 4 and 5. In the output image of the MTANN for nodules, the nodules are represented by light distributions. The output images for peripheral vessels and medium-size vessels are almost dark, as shown in FIG. 4. Because 70% of false positives are peripheral and medium-size vessels, it is possible to reduce the large number of false positives by using the output images of the MTANN.

However, the output images for part of a normal structure indicate relatively lighter small regions. In addition, the output images for soft-tissue opacities are almost light. Thus, the trained MTANN was not effective for these false positives that included part of normal structures and soft-tissue opacities.

The scoring method was applied to the output images of the MTANN in a validation test, in which $\sigma$=4.0 by trial and error.

Figure 6:
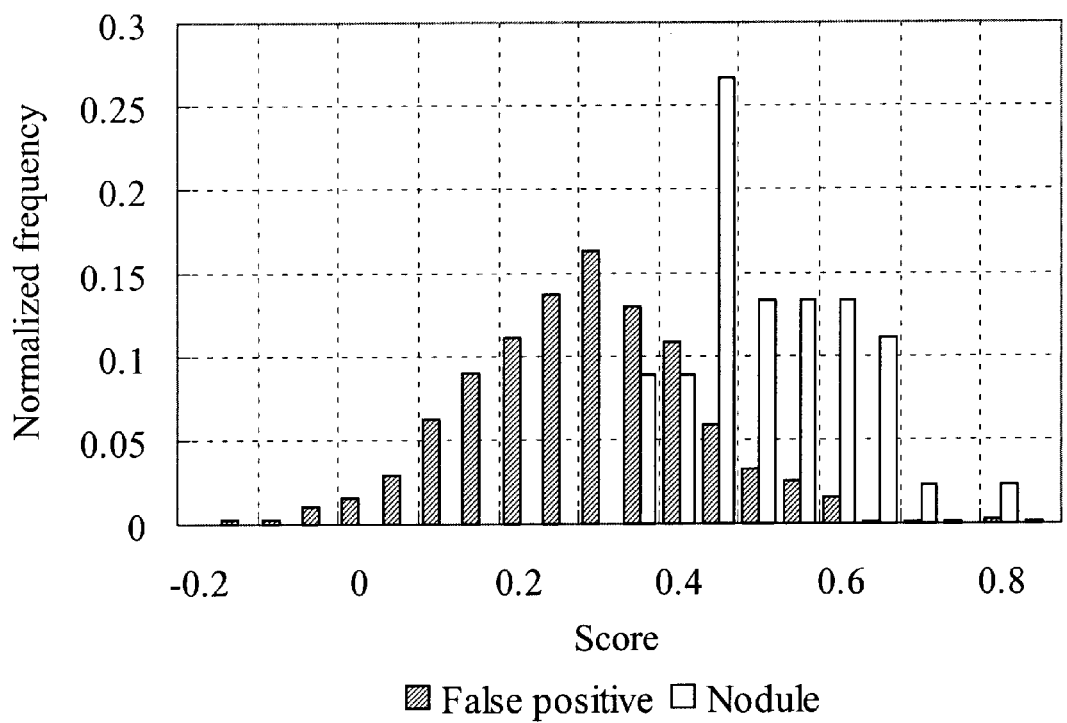
FIG. 6 is a histogram of scores for forty nodules (white bars) and 1068 non-nodules (gray bars) in a validation test, which were different from training cases of ten nodules and ten non-nodules.

FIG. 6 shows the distribution of the scores for 40 nodules and 1068 non-nodules, which are different from training cases of ten nodules and ten non-nodules. Although the two distributions overlap, it is possible to distinguish some non-nodules from nodules.

Figure 7:
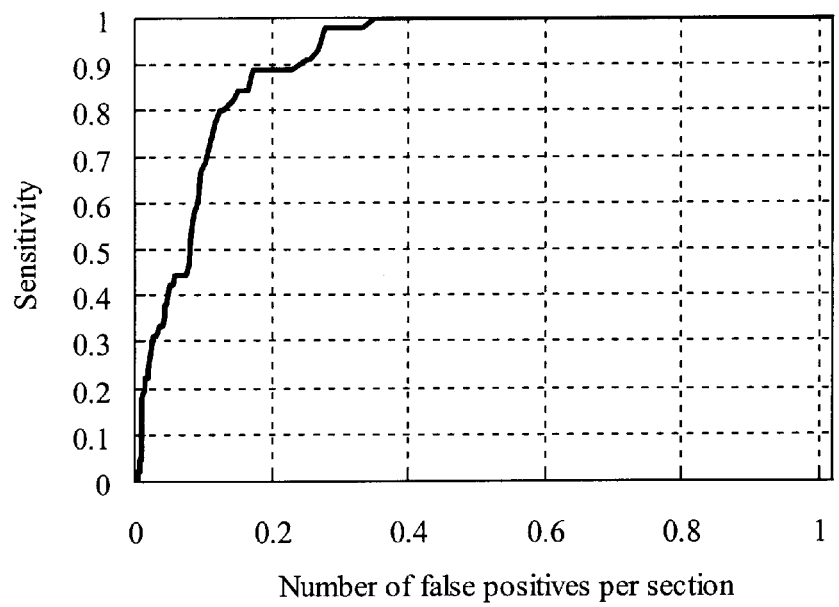
FIG. 7 is a FROC curve of an actual embodiment of the MTANN indicating 100% nodule detection sensitivity with a simultaneous a reduction in the false-positive rate from 1.02 to 0.35/section, for 40 nodules and 1068 false positives in a validation test.

The performance of the MTANN is evaluated by free-response receiver operating characteristic (FROC) curves (see Ref. 46), which are generated by plotting of the nodule detection sensitivity as a function of the number of false positives per section, as shown in FIG. 7. A 66% (706/1068) reduction of false positives (non-nodules) was achieved without reducing the number of true positives: a sensitivity of 100% (40/40) with 0.35 false positives per section was achieved.

The number of false positives per section FPS is defined by:

$$FPS = \frac{RFP}{SEC \times \left(\frac{TFP - FPT}{TFP}\right)} \quad \text{(Eqn. 6: FPS)}$$

where:

RFP is the number of remaining false positives after application of a false-positive reduction method, SEC is the number of sections, TFP is the total number of false positives reported by the CAD scheme, x is arithmetic multiplication, and FPT is the number of false positives used as training cases.

The false-positive rate was improved from 1.02 to 0.35 false positives per section, while maintaining sensitivity. This constitutes a significant improvement in the nodule detection scheme in CT because all false positives in the validation test are considered as "very difficult" false positives. Moreover, the nodules used in this study are considered as "very difficult" nodules because 38 cancers "missed" by radiologists are included.

Figure 8A:
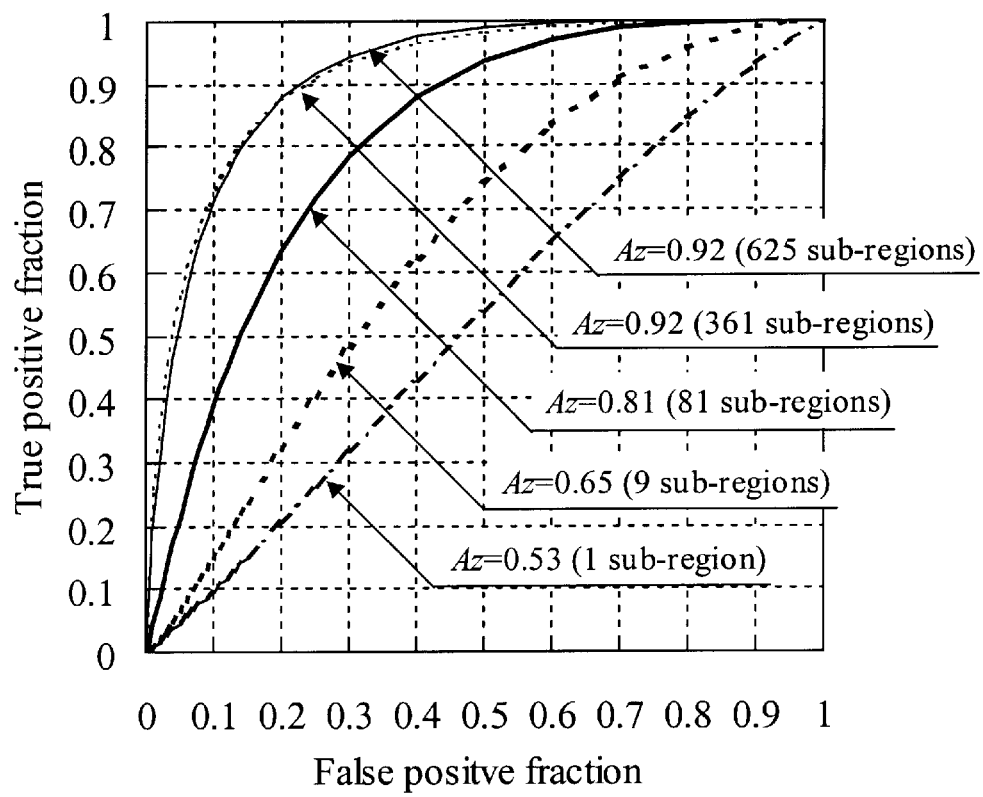
FIGS. 8(a) and 8(b) show, respectively, comparisons of ROC curves and Az values and the mean absolute error of the training set, obtained with various numbers of training sub-regions in a validation test.

In order to gain insight into such a high performance of the MTANN, the effect of the number of training sub-regions on performance was investigated, evaluating performance using receiver operating characteristic (ROC) analysis (Refs. 47, 48). FIG. 8 shows the ROC curves and the areas under the ROC curves (Az value) (Ref. 49). The results show that the performance of the MTANN decreased as the number of training sub-regions decreased. However, there was no increase in Az value when the size of the training sub-region was increased from 19×19 to 25×25. This is the reason for employing 19×19 as the size of the training sub-region. This result leads to the conclusion that the reason for the high performance of the MTANN is the large number of training samples used.

Figure 8B:
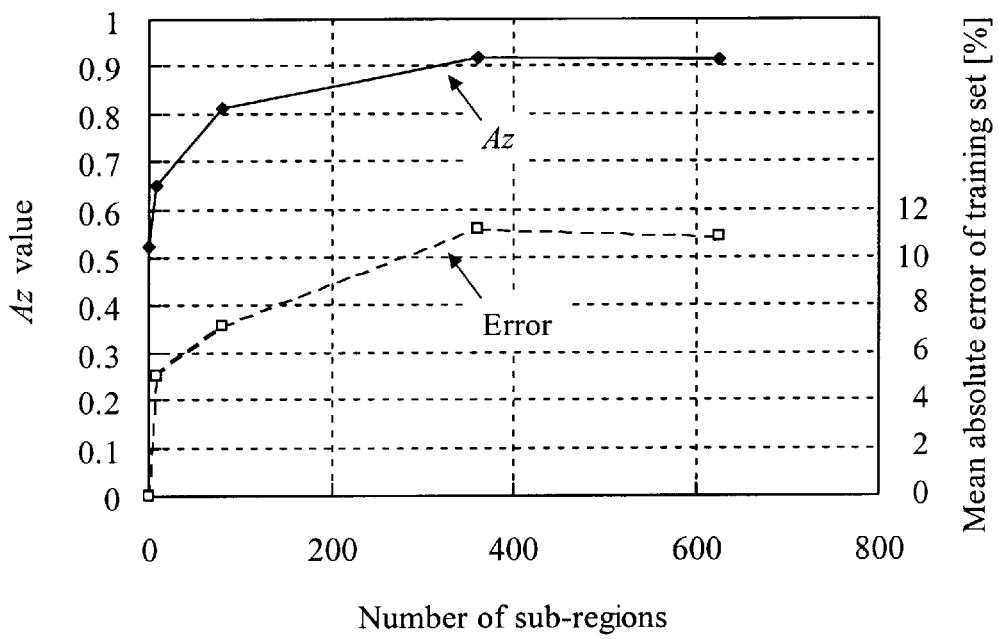

The performance in the case of a small number of training sub-regions was not caused by insufficient training, because the mean absolute error of the training set was very small, as shown in FIG. 8(b).

Table 1 shows the comparison of the MTANN and the conventional ANN in terms of the total number of training samples (sub-regions) and the total number of iterations used for training with ten nodules and ten non-nodules.

TABLE I

|  | MTANN (Invention) | | Conventional ANN | |
| --- | --- | --- | --- | --- |
|  | Nodule | Non-nodule | Nodule | Non-nodule |
| Number of training cases | 10 | 10 | 10 | 10 |
| Number of sub-regions per case | 19 × 19 | 19 × 19 | 1 | 1 |
| Number of training epochs | 5.0 × 10$^5$ | 5.0 × 10$^5$ | 1.0 × 10$^4$ | 1.0 × 10$^4$ |
| Total number of iterations | 1.8 × 10$^9$ | 1.8 × 10$^9$ | 1.0 × 10$^5$ | 1.0 × 10$^5$ |

Because a large number of sub-regions that overlapped each other were used for training in the MTANN, the total number of training samples of the MTANN was far greater than that of the conventional ANN (Ref. 50), which included the shift-invariant neural network and the convolution neural networks (Refs. 51–56).

In general, the greater the number of training samples, the greater the number of iterations required to perform adequate training. Therefore, a large number of epochs are required for training of the MTANN. In Table 1, the total numbers (20×19×19 and 2×1.8×10$^9$) of samples (sub-regions) and iterations of the MTANN are far greater than those (20 and 2×10$^5$) of the conventional ANN, which indicates clearly the massive training required by the MTANN. These 3.6 billion iterations of massive training lead to the high performance of the MTANN, whereas the conventional ANN can be trained with only 200,000 iterations, and yielded an Az value of 0.53.

Figure 9A:
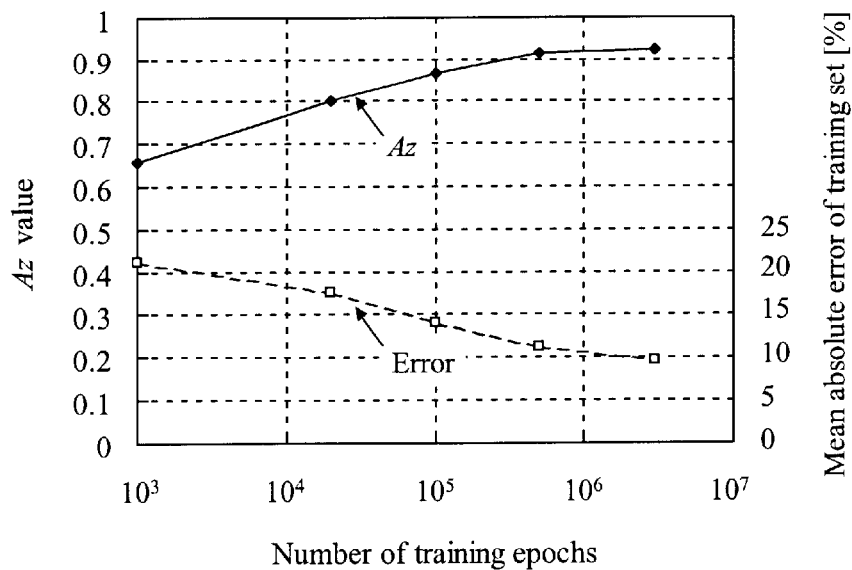
FIG. 9(a) shows the effect of the number of training epochs on the generalization ability of an actual embodiment of the MTANN: As the number of training epochs increased, the Az value representing the generalization ability did not decrease, while the training error decreased.
Figure 9:
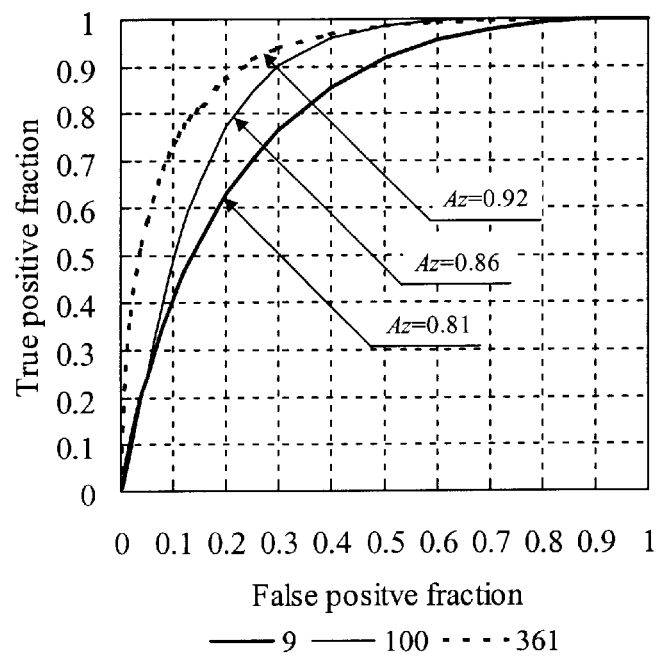
FIG. 9(b) further shows how nodule detection sensitivity (true positives) as a function of false positives, improves with the number of sub-regions even if consecutive sub-regions are sparsely sampled and not maximally overlapping.
FIGS. 9(c) and 9(d) show shaded object pixels, in sub-regions used in the training that yielded the results in FIG. 9(b).

This large number of iterations did not cause overtraining, because Az values obtained with test cases, representing the generalization ability, did not decrease as the number of training epochs increased, while the error of the training cases decreased, as shown in FIG. 9(a).

Figure 9C:
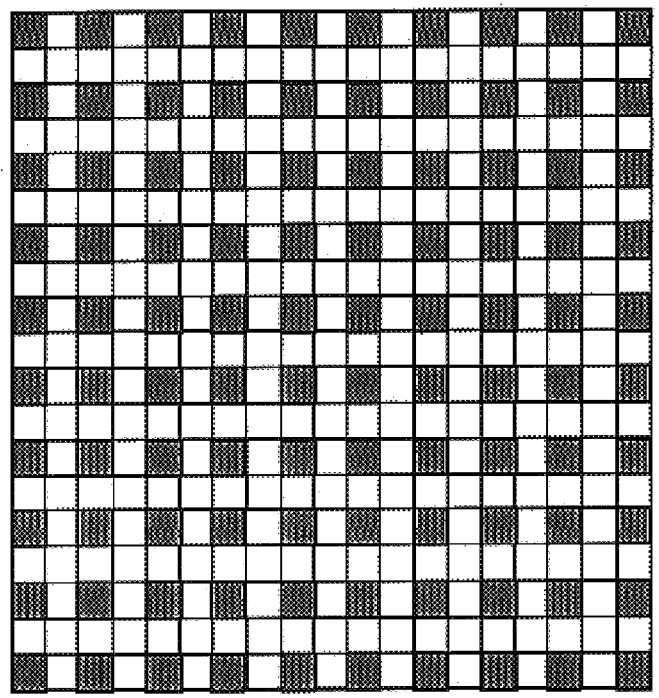
Figure 9D:
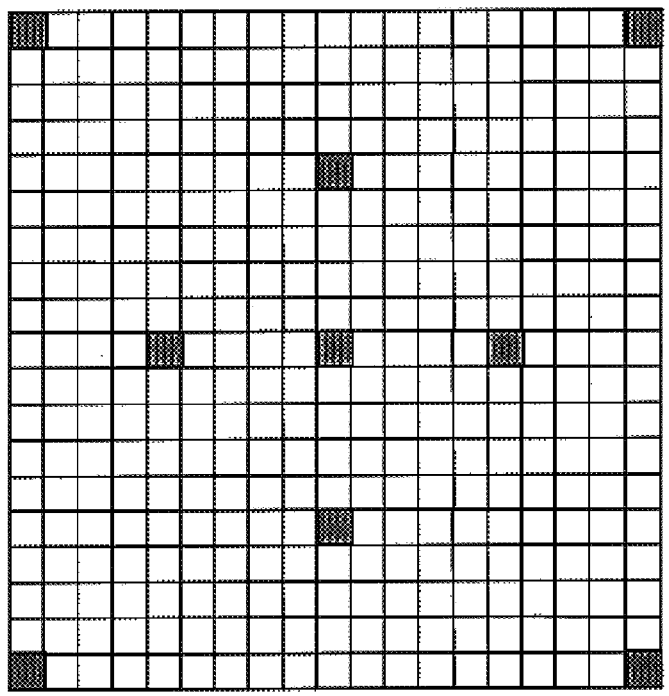

The effect on performance of "thinning out" training sub-regions was investigated. Here, "thinning out" denotes "sparse sampling" of sub-regions, as compared with sub-regions that are consecutively maximally overlapping (shifted by the minimal separation distance of immediately adjacent pixels). FIG. 9(b) shows how nodule detection sensitivity (true positives) as a function of false positives, improves with the number of sub-regions. Reference is made to FIGS. 9(c) and 9(d) which show shaded object pixels, in the 3×3 pixel sub-regions used for training.

Using the 100 sub-regions in the pattern shown in FIG. 9(c) yielded an Az=0.86, and using the nine sub-regions in the pattern shown in FIG. 9(d) yielded an Az=0.81. FIG. 9(b) presents these two curves with the Az=0.92 found when using 361 maximally overlapping consecutive sub-regions, previously presented in FIG. 8(a). Thus, it may be concluded that efficient training can be performed using thinned out (sparsely sampled) sub-regions in the training region.

Thus, the invention provides a novel pattern recognition technique based on an artificial neural network, which may be called a massive training artificial neural network (MTANN), especially useful for reduction of false positives in computerized detection of lung nodules in low-dose CT images. Results demonstrate that the MTANN reduces false positives while maintaining sensitivity.

The MTANN and the Multi-MTANN are particularly useful for improving the specificity (reducing false positives) of a computer aided diagnosis (CAD) scheme for lung nodule detection, while maintaining sensitivity (true positives). To improve sensitivity, the MTANN may be applied to the initial step of a CAD scheme for detection of nodules.

Briefly, the MTANN is trained to distinguish between typical nodules and typical non-nodules (normal tissues and structures). The trained MTANN is then applied to a medical image such as a CT image (section). Gaussian filtering is performed on the trained MTANN's output image (or map), to arrive at a score that is compared to a threshold to arrive at a decision.

A multiple gray-level-thresholding technique initially identified 20,743 nodule candidates in 1057 CT sections with a sensitivity of 86% (43/50). An MTANN that had been trained to distinguish between nodules and medium-size vessels was applied to 1057 original CT images. Then Gaussian filtering and thresholding together with removal of small and large region were applied to the output images of the trained MTANN. Results showed that 14,267 nodule candidates including all 50 nodules were identified: a sensitivity of 100% (50/50) with 13.5 false positives per section, was achieved. Therefore, the sensitivity of a known CAD scheme was improved from 86% to 100%, while the number of nodule candidates is reduced from 20,743 (19.6 false positives per section) to 14,267 (13.5 false positives per section).

It has thus been demonstrated that the inventive MTANN is able to improve the sensitivity of a CAD scheme for lung nodule detection. Therefore, both the sensitivity (true positive detection) and the specificity (false positive reduction) of CAD schemes are improved by use of a combination of the MTANN for nodule candidate detection and a first level of distinguishing between nodules and non-nodules, and the Multi-MTANN for an enhanced level of distinguishing between nodules and non-nodules.

The inventive MTANN can handle three-dimensional volume data by increasing the numbers of input units and hidden units. Thus, the MTANN is applicable to new modalities such as multi-slice CT and cone-beam CT for computerized detection of lung nodules.

The inventive MTANN is also to perform many different tasks for distinction, classification, segmentation, and detection of normal regions and/or lesions in various CAD schemes in medical images, such as detection and classification of lung nodules in chest radiography and CT; detection and classification of clustered microcalcifications and masses in mammography, ultrasonography, and magnetic resonance imaging (MRI); detection and classification of polyps in CT colonography; and detection and classification of skeletal lesions in bone radiography.

Another inventive embodiment is now described: The multiple massive training artificial neural network (Multi-MTANN) includes plural units of the MTANN described above.

A single MTANN is effective for distinguishing between nodules and peripheral and medium-size vessels. However, other non-nodules, such as large vessels in the hilum, soft-tissue opacities caused by the diaphragm or the heart, parts of normal structures, and some other abnormal opacities, prove more problematic. Compared to the Multi-MTANN, it is difficult for a single MTANN to distinguish between nodules and various such types of non-nodules because the capability of a single MTANN is limited compared to the Multi-MTANN.

Figure 10:
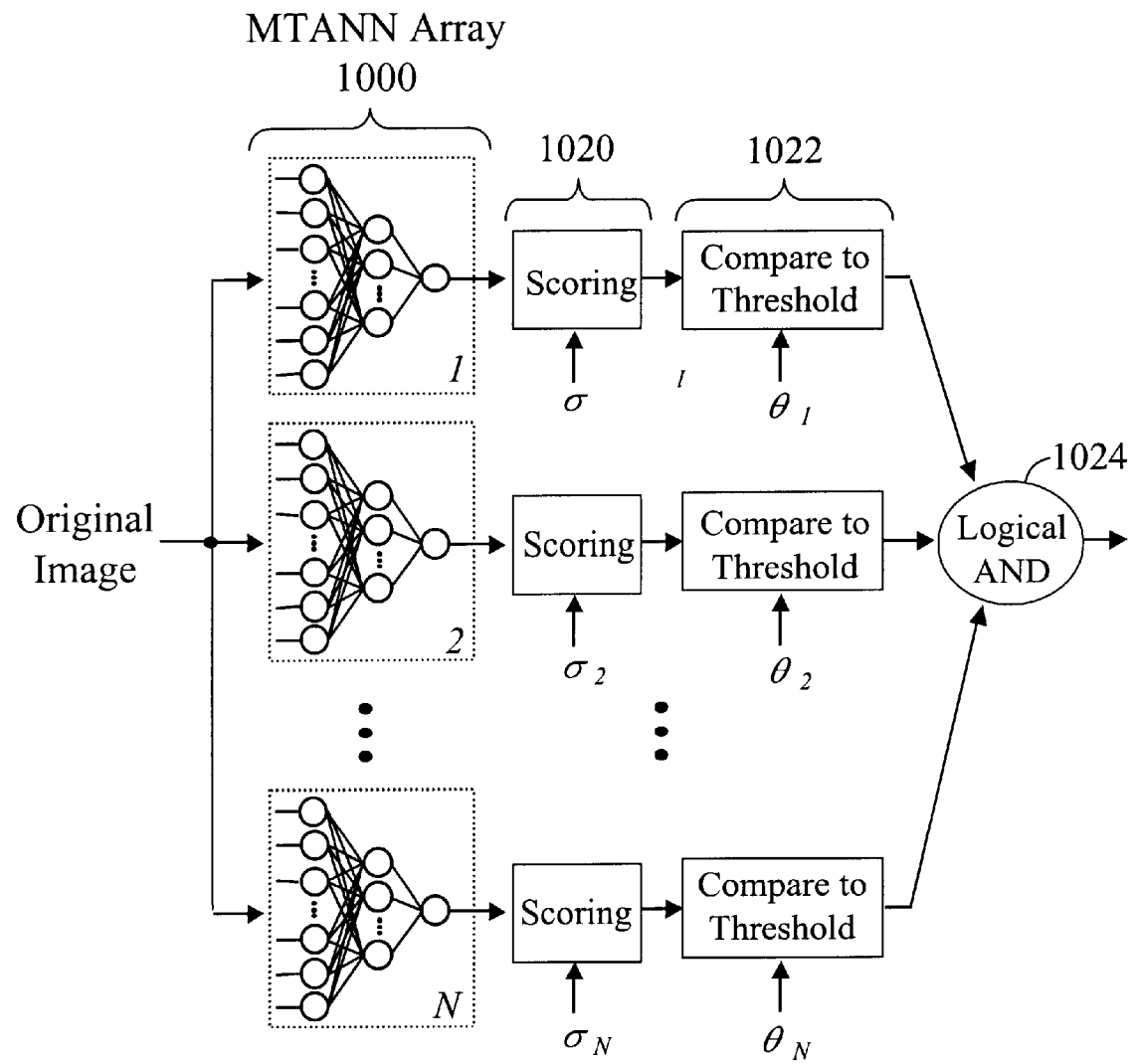
FIG. 10 is a schematic block diagram illustrating an exemplary architecture of a multiple massive training artificial neural network (Multi-MTANN). In a preferred embodiment, each MTANN is trained using a different type of non-nodule, but with the same nodules so that each MTANN acts as an expert for distinguishing nodules from a specific type of non-nodule. The performance of plural MTANNs is integrated by a logical AND operation.

In order to distinguish between nodules and various types of non-nodules, the Multi-MTANN extends the capability of a single MTANN. The architecture of an exemplary Multi-MTANN is shown in FIG. 10.

The illustrated exemplary Multi-MTANN includes plural (here, N) MTANNs arranged in parallel in an MTANN array 1000. In a preferred embodiment, each MTANN is trained by using a different type of normal anatomical structure (sometimes referred to herein a non-lesion or a non-nodule), but with the same abnormality (lesion or nodule). Each MTANN acts as an expert for distinguishing between abnormalities (nodules) and its specific type of normal anatomical structure (non-nodule). For example, a first MTANN may be trained to distinguish nodules from medium-size vessels; a second MTANN may be trained to distinguish nodules from soft-tissue opacities caused by the diaphragm; and so on. Various normal structures that may be distinguished include:

large vessels in the hilum,
large vessels with opacities,
medium-sized vessels,
small vessels,
soft-tissue opacities caused by a heart,
soft-tissue opacities caused by a diaphragm,
soft-tissue opacities caused by a partial volume effect between peripheral vessels and the diaphragm,
abnormal opacities,
focal infiltrative opacities,
and other normal anatomical structures.

At the output of the MTANNs are respective filters in a filter array 1020 that perform a scoring function on the likelihood distribution maps (output images) that are provided by the MTANNs. The filters in filter array 1020 correspond generally to MTANN filter 120 (FIG. 1(a)). In a preferred embodiment, the same scoring method may be applied to the output of each MTANN.

At the output of the filter/scoring element array 1020 is a threshold element array 1022 whose individual elements correspond generally to threshold element 122 (FIG. 1(a)). Thresholding of the score for each MTANN is performed to distinguish between a nodule and the type of non-nodule that is specific to that MTANN. The threshold elements in array 1022 arrive at N respective decisions concerning the presence of an abnormality.

The performance of the N MTANNs is then merged or integrated, for example, by a logical AND operation, shown in FIG. 10 by a logical AND operator 1024. Because each MTANN expertly eliminates a specific respective type of non-nodule with which that particular MTANN is trained, the multi-MTANN eliminates a larger number of false positives than does any single MTANN. The operation of the logical AND element depends on the training of the various MTANNs.

The Multi-MTANN may be trained in the following manner. In a preferred embodiment, each MTANN is trained independently by a same abnormality (nodule) but with different normal structures (non-nodules).

First, the false positives (non-nodules) reported by the CAD scheme for lung nodule detection in CT are classified into a number of groups. The number of groups may be determined by the number of obviously different kinds of false positives.

In a preferred embodiment, typical non-nodules in each group are selected as training cases for a particular respective MTANN, whereas typical nodules are selected as training cases for all MTANNs. The original images of nodule candidates are used as the input images for training. The teacher image is designed to contain the distribution for the likelihood of being a nodule, i.e., the teacher image for nodules contains a two-dimensional Gaussian distribution with standard deviation $\sigma_T$; and that for non-nodules contains zero (−1000 HU (Hounsfield units)).

Each MTANN is trained by a modified back-propagation algorithm with training cases. Then, the input images and the desired teacher image are used to train each MTANN in the same way as a single MTANN is trained. The MTANN acts as an expert for the specific type of non-nodules after training.

The outputs of the MTANNs may be scored as follows. The output from each trained MTANN is scored independently. The score $S_{n,s}$ for the $n^{th}$ trained MTANN is defined as:

$$S_{n,s} = \sum_{x,y \in R_E} f_G(\sigma_n; x, y) \times f_{n,s}(x, y) \quad \text{(Eqn. 7: Score of output images)}$$

where:
$R_E$ is the region for evaluation,
$f_{n,s}(x, y)$ is $s^{th}$ output image (case) of the $n^{th}$ MTANN,
× is arithmetic multiplication, and
$ff_G(\sigma_n; x, y)$ is a two-dimensional Gaussian function with standard deviation $\sigma_n$.

The parameter $\sigma_n$ may be determined by the output images of the trained MTANN with training cases. Distinguishing between nodules and the specific type of non-nodules is performed by thresholding of the score with a threshold $\theta_n$ for the n-th trained MTANN.

The distinctions of the expert MTANNs are combined by use of a logical AND operation such that each of the trained MTANNs maintains the detection of all nodules, but removes some of the specific type of non-nodules, and thus various types of non-nodules can be eliminated.

The invention envisions that the logical AND function may be performed in at least two ways. First, a logical AND combiner may provide an indication of an abnormality (lesion or nodule), only if all the individual MTANNs indicate an abnormality. Alternatively, the logical AND combiner may provide an indication of no abnormality (no lesion or no nodule), only if all the individual MTANNs indicate no abnormality.

The first embodiment of the logical AND combiner, in which the AND function indicates an abnormality only when all MTANNs indicate an abnormality, is preferred in most circumstances. However, this preference depends on the training of the individual MTANNs: the first embodiment is preferred when the MTANNs are trained with different non-lesions but with the same lesions. However, when the MTANNs are trained with different lesions but with the same non-lesions, the alternative realization of the AND function is appropriate.

Usually, the variation among abnormalities (lesions, nodules) is small, and the variation among normal structures is large, so that the first embodiment is generally preferred. However, in many applications, such as when the abnormalities are interstitial opacities, the alternative embodiment is preferred. The choice of implementations of the AND function is based on the anatomical structures involved and the corresponding MTANN training.

As an alternative to the embodiment shown in FIG. 10, it is possible to form a "merged image" by adding all the individual MTANNs' images, and then apply scoring/ filtering and thresholding to the single merged image. However, the performance of the FIG. 10 embodiment is superior to that of the alternative embodiment. If the performances are combined by a linear operation such as pixel addition, performance is not as high. An important advantage of the FIG. 10 embodiment is to combine the different performances of the MTANNs by thresholding with different threshold values tailored to each performance.

Results of a study for a particular application of the Multi-MTANN are presented as follows.

The false positives (non-nodules) reported by a known CAD scheme were classified into ten groups, and thus the Multi-MTANN employed ten MTANNs. Ten nodules and ten non-nodules were used as the training cases for each MTANN. Therefore, ten nodules and 100 non-nodules were used for training the Multi-MTANN.

Figure 11:
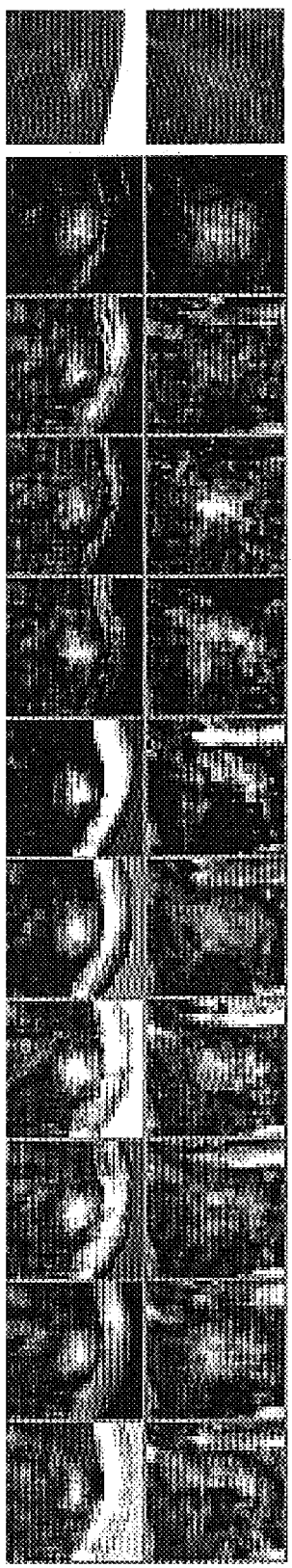
FIG. 11 shows two nodules (top row) used as training cases for training an actual embodiment of the Multi-MTANN, and ten sets of output images of ten trained MTANNs; the ten MTANNs were trained separately with different types of non-nodules, as shown in FIGS. 12(a) and 12(b).
Figures 12A, 12B:
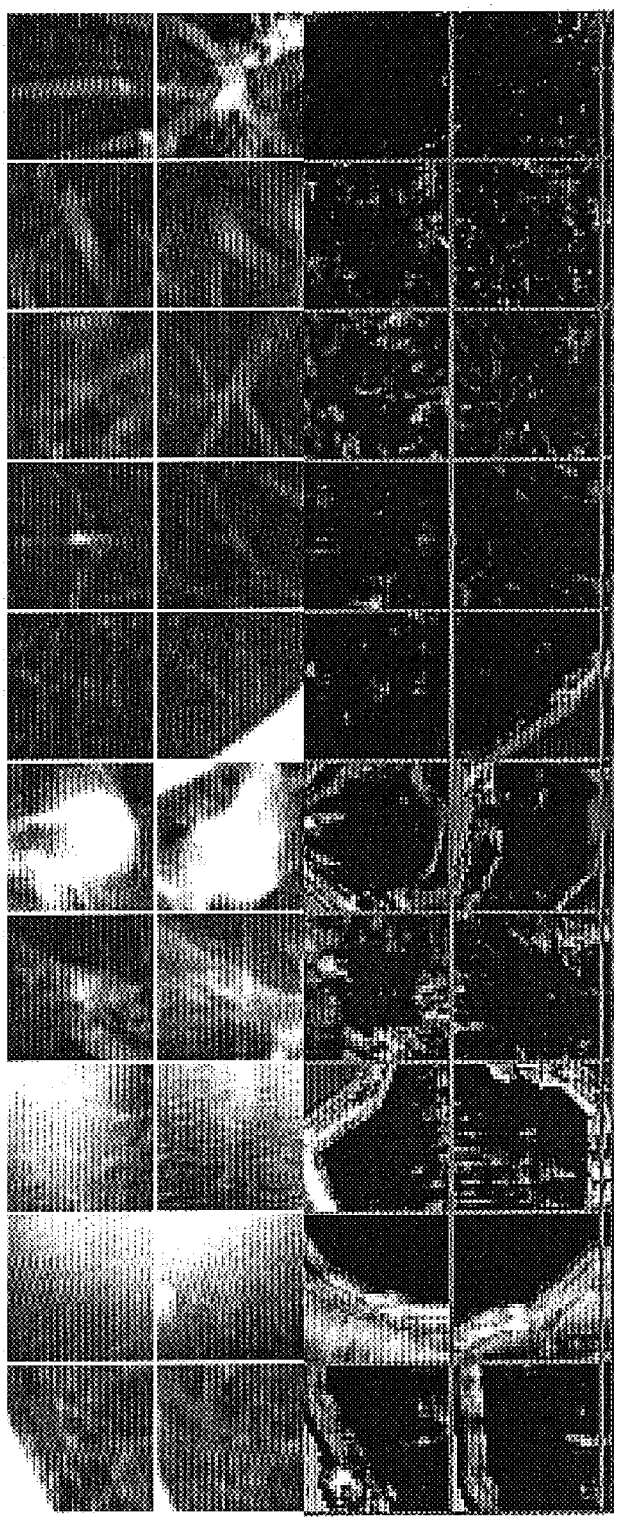
FIGS. 12(a) and 12(b) illustrate, respectively, ten sets of non-nodules (two examples in each group), and ten sets of corresponding output images, of ten trained MTANNs with training cases, in a consistency test.

Examples of the training cases in 40 by 40 pixel regions are shown in FIGS. 11 and 12(a). Non-nodules for MTANN No. 1 to No. 5 ranged from medium-size vessels to small peripheral vessels. Non-nodules for MTANN No. 6 to No. 10 were large vessels in the hilum, relatively larger-size vessels with some opacities, soft-tissue opacities caused by the partial volume effect between peripheral vessels and the diaphragm, soft-tissue opacities caused by the diaphragm or the heart, and some abnormal opacities (focal infiltrative opacities), respectively. All parameters of the multi-MTANN were the same as the parameters of the single MTANN.

The training of each MTANN was performed on 500,000 epochs. The trainings converged with a mean absolute error between 6.9% and 14.7%. Each of the trainings took 29.8 hours on a PC-based workstation (CPU: Pentium IV 1.7 GHz).

The results of applying each of the trained MTANNs to nodule candidates in training cases, which corresponds to a consistency test, are shown in FIGS. 11 and 12(b). The nodules in the output images of the MTANNs are represented by light distributions at the center, whereas the output images for false positives (non-nodules) are relatively dark.

Figure 13:
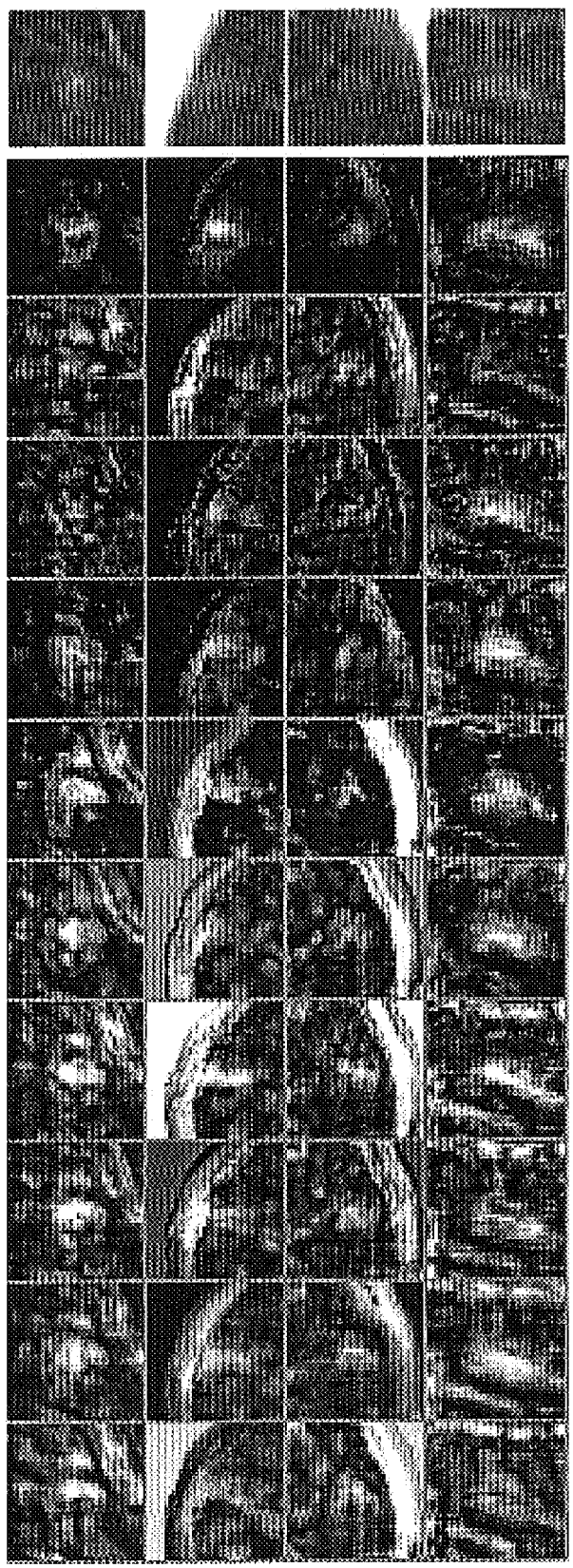
FIG. 13 illustrates four nodules (non-training cases) in the top row, and ten sets of corresponding output images of the ten trained MTANNs, in a validation test.
Figures 14A, 14B:
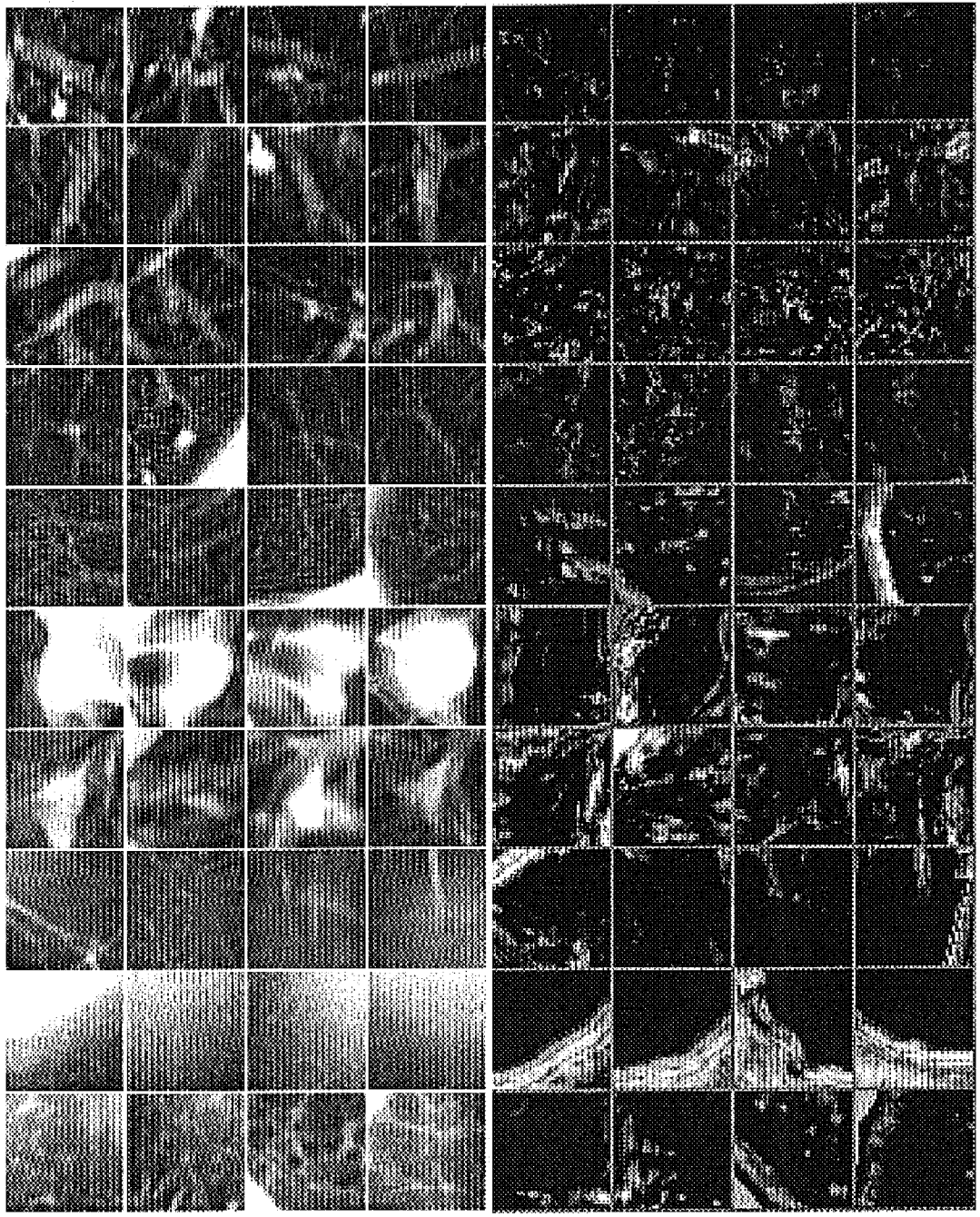
FIGS. 14(a) and 14(b) show, respectively, ten sets of non-nodules (four cases in each group) and ten sets of corresponding output images of the ten trained MTANNs, in a validation test.

The trained multi-MTANN was applied to nodule candidates in all of 978 non-training test cases, which were different from training cases of ten nodules and 100 non-nodules. The results for non-training cases in a validation test are shown in FIGS. 13 and 14(b). The output images of MTANNs for nodules are represented by light distributions. The output images for false positives are relatively dark around the center, as shown in FIG. 14(b). The output images for large vessels in the hilum (sixth row), soft-tissue opacities (ninth row), and abnormal opacities (tenth row) are also dark, whereas the single MTANN trained for vessels (MTANN No. 1 to No. 5) were not effective for these false positives.

Figure 15A:
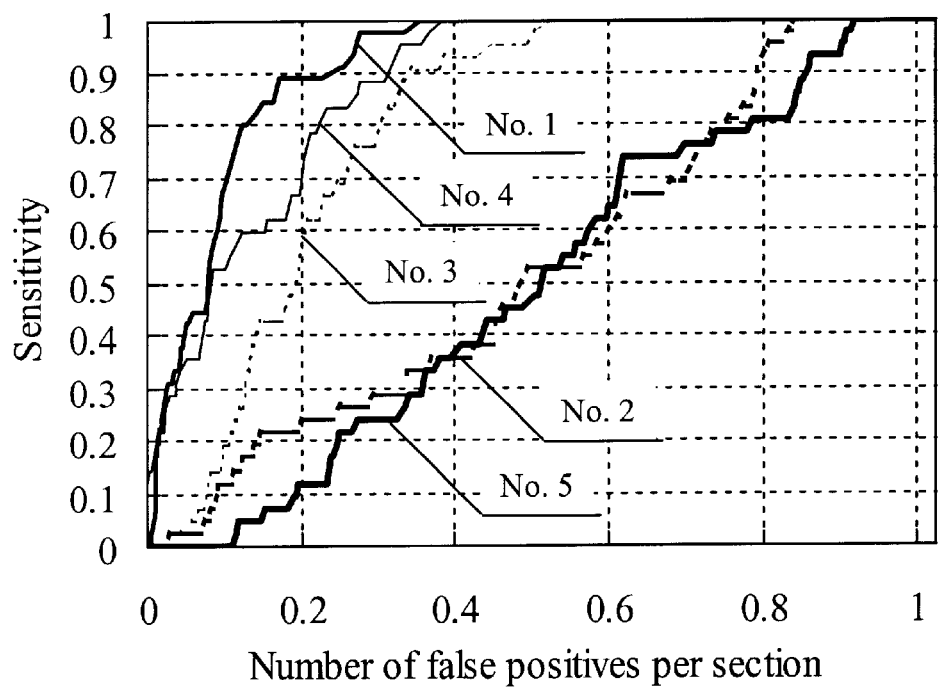
FIGS. 15(a) and 15(b) show, respectively, FROC curves of trained MTANNs 1–5 and 6–10, for 40 nodules and 978 false positives, in a validation test.
Figure 15B:
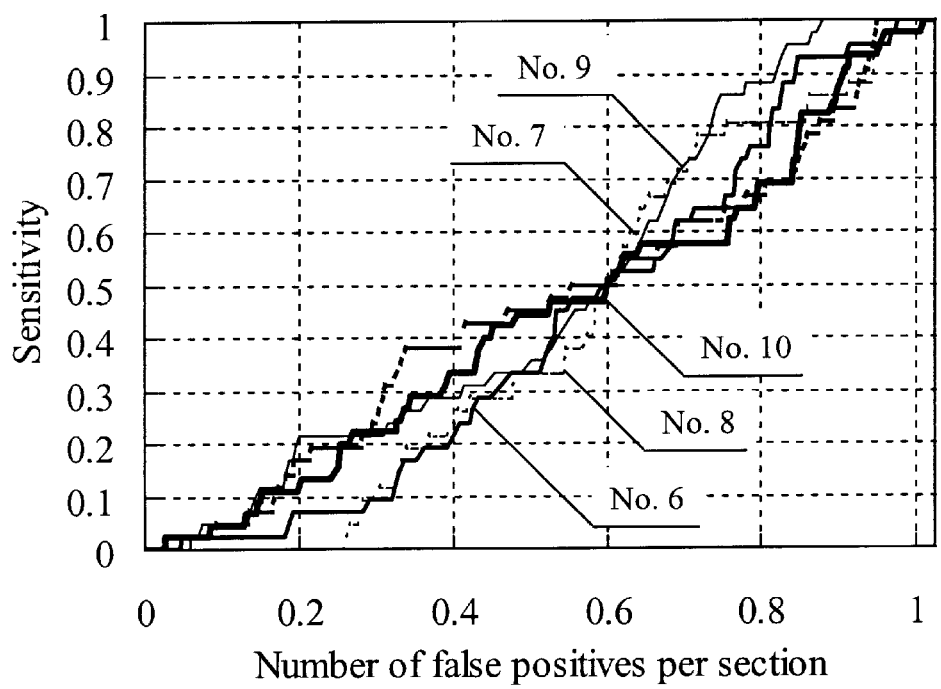

The scoring method was applied to the output images of the trained MTANNs in the validation test, where $\sigma_n$ was empirically determined as 0.5 to 5.5 by use of the training cases. The performance of the MTANN was evaluated by FROC curves, as shown in FIG. 15. The FROC curve expresses the nodule detection sensitivity as a function of the number of false positives per section at a specific operating point, which is determined by the threshold $\theta_n$. The performance of the MTANNs varied considerably, because the FROC curves were obtained with all non-training false positives (non-nodules). The MTANN trained with dominant false positives such as medium-size and peripheral vessels seems to have a better overall performance for all false positives (non-nodules).

Figure 16:
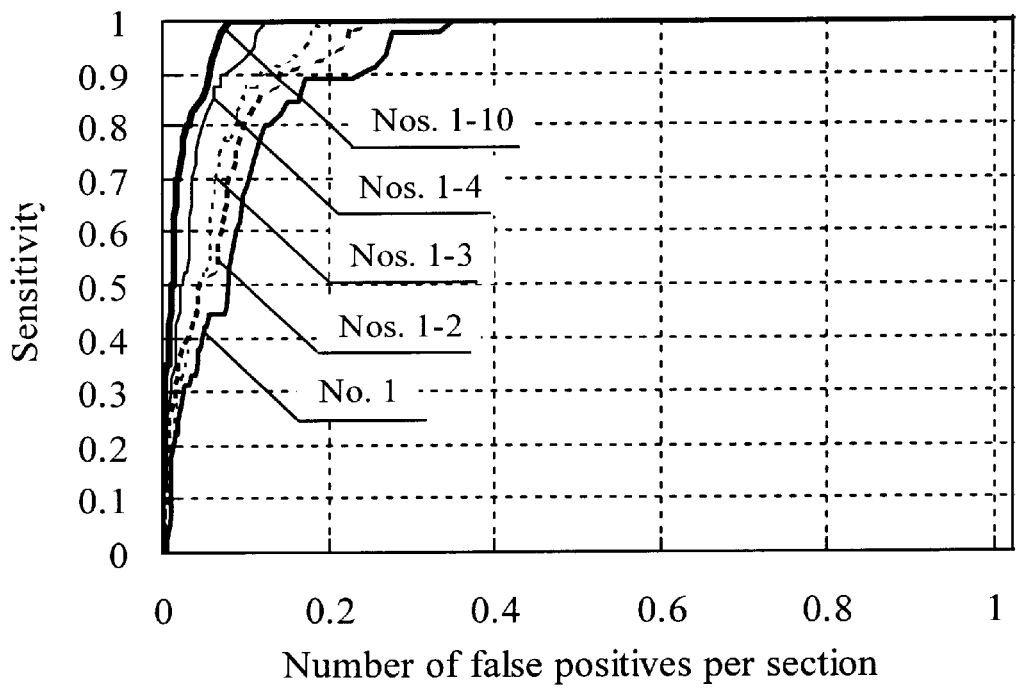
FIG. 16 shows FROC curves of embodiments of the Multi-MTANNs obtained with various numbers of MTANNs, for 40 nodules and 978 false positives, in a validation test. The FROC curve of the Multi-MTANN including ten MTANNs indicates 100% nodule detection sensitivity and a reduction of false-positive rate from 1.02 to 0.08 per section.
Figure 17:
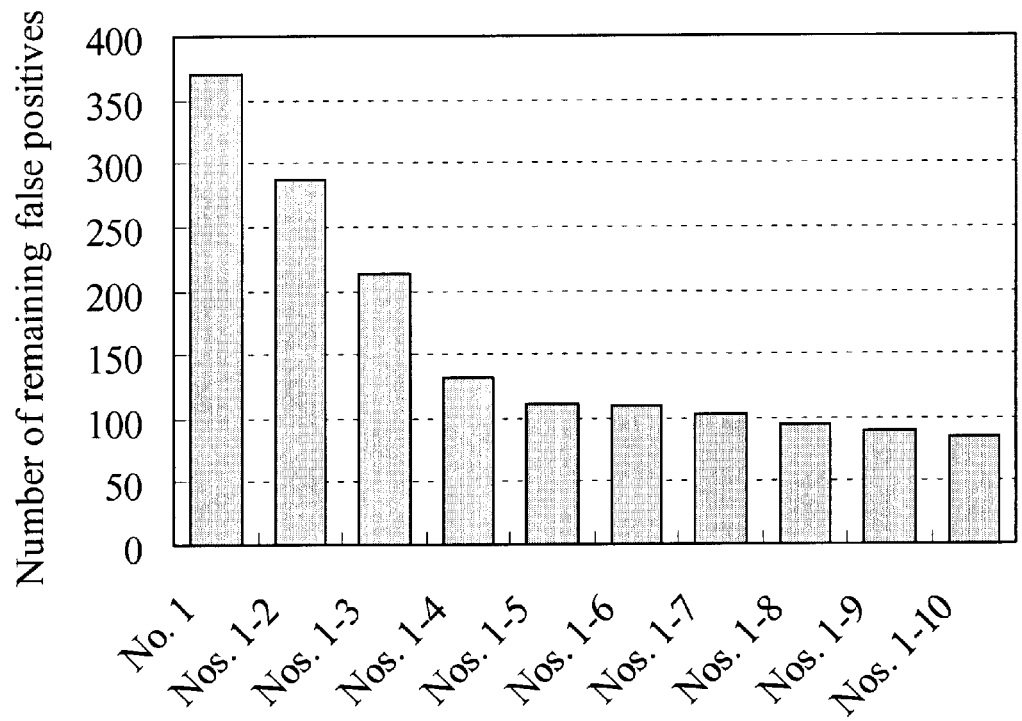
FIG. 17 is a chart showing the number of remaining false positives obtained by a Multi-MTANN at a sensitivity of 100%, obtained with various numbers of MTANNs. The number of false positives reported by a known CAD scheme was reduced from 978 to 85 by use of the Multi-MTANN including ten MTANNs.

FROC curves of the Multi-MTANNs obtained with various number of MTANNs are shown in FIG. 16. When the Multi-MTANN employed ten MTANNs, 91% (893/978) of false positives (non-nodules) were removed without a reduction in the number of true positives: a sensitivity of 100% (40/40) with 0.08 false positives per section was achieved. FIG. 17 shows the number of remaining false positives of the multi-MTANN at the sensitivity of 100% obtained with various number of MTANNs. Therefore, the false-positive rate was improved from 1.02 to 0.08 false positives per section while maintaining sensitivity.

Thus, the Multi-MTANN reduced a large number of false positives compared to a single MTANN, and the Multi-MTANN is useful for reducing false positives in CAD schemes for lung nodule detection in low-dose CT.

Figure 18A:
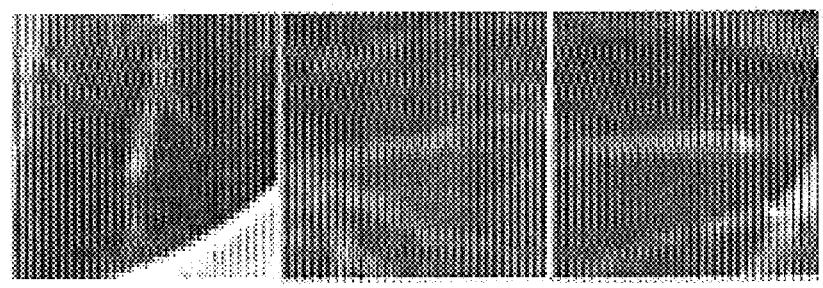
FIG. 18(a) shows original images of vessels (which are normal structures) input to an MTANN that had been trained on input images containing medium-size vessels (also normal structures) in vertical and horizontal directions.
Figure 18B:
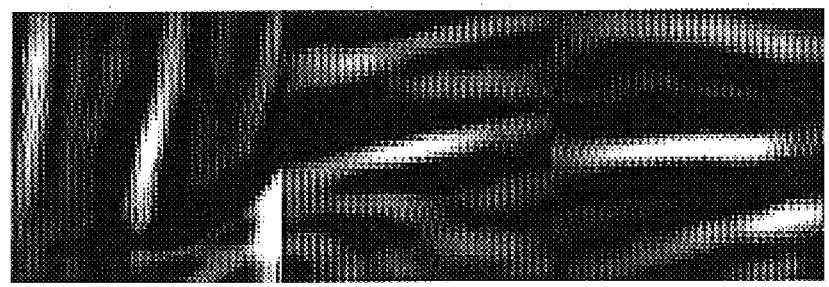
FIG. 18(b) shows the output images of the trained MTANN.

MTANN can detect normal structures in addition to detecting abnormalities (lesions, nodules). FIG. 18(a) shows original images of vessels (normal structures) input to an MTANN that had been trained on input images containing medium-size vessels (normal structures) in vertical and horizontal directions. FIG. 18(b) shows the output images of the trained MTANN, demonstrating that the MTANN can effectively detect medium-size vessels in the vertical and the horizontal directions. MTANNs trained in this manner are of particular use as components of a multi-MTANN.

The inventive system conveniently may be implemented using a conventional general purpose computer or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

In a particular preferred embodiment, the artificial neural network was programmed in software using the C programming language on a Linux based machine. Of course, other suitable programming languages operating with other available operating systems may be chosen to implement the invention.

A general-purpose computer may implement the method of the present invention, wherein the computer housing houses a motherboard which contains a CPU (central processing unit), memory such as DRAM (dynamic random access memory), ROM (read-only memory), EPROM (erasable programmable read-only memory), EEPROM (electrically erasable programmable read-only memory), SRAM (static random access memory), SDRAM (synchronous dynamic random access memory), and Flash RAM (random access memory), and other optical special purpose logic devices such as ASICs (application-specific integrated circuits) or configurable logic devices such GAL (generic array logic) and reprogrammable FPGAs (field programmable gate arrays ).

The computer may also include plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer readable medium. Examples of computer readable media include compact discs, hard disks, floppy disks, tape, magneto-optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits (ASICs) or by interconnecting an appropriate network of conventional component circuits, as will be readily apparent to those skilled in the art.

The invention is embodied in trained artificial neural networks, in arrangements for training such artificial neural networks, and in systems including both the network portion and the training portions. Of course, the invention provides methods of training and methods of execution. Moreover, the invention provides computer program products storing program instructions for execution on a computer system, which when executed by the computer system, cause the computer system to perform the methods described herein.

The invention may be applied to virtually any field in which a target pattern must be distinguished from other patterns in image(s). The MTANN distinguishes target objects (or areas) from others by using pattern (feature) differences: artificial neural networks, trained as described above, can detect target objects (or areas) that humans might intuitively recognize at a glance. For example, the invention may be applied to these fields, in addition to the medical imaging application that is described above:

Detection of other vehicles, white line lane markers, traffic signals, pedestrians, and other obstacles in road images, Detection of eyes, mouths, and noses in facial images, Detection of fingerprints in "dust" images, Detection of faulty wiring in semiconductor integrated circuit pattern images, Detection of mechanical parts in robotic eye images, Detection of guns, knives, box cutters, or other weapons or prohibited items in X-ray images of baggage, Detection of airplane shadows, submarine shadows, schools of fish, and other objects, in radar or sonar images, Detection of missiles, missile launchers, tanks, personnel carriers, or other potential military targets, in military images, Detection of weather pattern structures such as rain clouds, thunderstorms, incipient tornadoes or hurricanes, and the like, in satellite and radar images, Detection of areas of vegetation from satellite or high-altitude aircraft images, Detection of patterns in woven fabrics, for example, using texture analysis, Detection of seismic or geologic patterns, for use in oil or mineral prospecting, Detection of stars, nebulae, galaxies, and other cosmic structures in telescope images, And so forth.

The various applications of detection, exemplified in the list above, can be succeeded by a distinction of one specific target structure from another specific structure, once they have been detected. For example, after a fingerprint is detected in a "dust" image, the detected fingerprint can be compared to suspects' fingerprints to verify or disprove the identify of the person leaving the detected fingerprint.

More generally, the inventive MTANN can identify target objects (or areas) in images, if there are specific patterns (or features) that represent those objects or areas. The patterns or features may include:

texture, average gray level, spatial frequency, orientation, scale, shape, and so forth.

Thus, it is seen that the functionality and applicability of the inventive MTANN extends far beyond analysis of medical images.

Numerous modifications and variations of the present invention are possible in light of the above teachings. For example, the invention may be applied to images other than low-dose CT lung images. Further, the particular technique of training the artificial neural network, the particular architecture of the artificial neural network, the particular filtering of the output of the artificial neural network, the particular likelihood distribution used in a training teacher image, and the particular training medical images, may be varied without departing from the scope of the invention. Of course, the particular hardware or software implementation of the invention may be varied while still remaining within the scope of the present invention. It is therefore to be understood that within the scope of the appended claims and their equivalents, the invention may be practiced otherwise than as specifically described herein.

What is claimed as new and desired to be secured by Letters Patent of the United States is:

1. A method of training an artificial neural network including network parameters that govern how the artificial neural network operates the method comprising:

receiving at least a training image including plural training image pixels;

receiving at least a likelihood distribution map as a teacher image, the teacher image including plural teacher image pixels each having a pixel value indicating likelihood that a respective training image pixel is part of a target structure;

moving a local window across plural sub-regions of the training image to obtain respective sub-region pixel sets;

inputting the sub-region pixel sets to the artificial neural network so that the artificial neural network provides output pixel values;

comparing the output pixel values to corresponding teacher image pixel values to determine an error; and training the network parameters of the artificial neural network to reduce the error.

2. The method of claim 1, wherein:

the training image receiving step includes receiving at least a training medical image; and the local window moving step includes moving the local window across the plural sub-regions of the training medical image to obtain the respective sub-region pixel sets.

3. The method of claim 2, wherein the step of receiving at least a training medical image includes:

receiving one or more training medical images that include an abnormality and a normal anatomical structure.

4. The method of claim 3, further comprising:

coordinating the step of receiving at least an abnormality likelihood distribution map and the step of receiving at least a training medical image, so that:

(1) when the training medical image includes an abnormality, the teacher image pixel values represent likelihoods that corresponding training medical image pixels are part of an abnormality; and (2) when the training medical image does not include an abnormality, the teacher image pixel values represent an absence of an abnormality at corresponding training medical image pixel locations.

5. The method of claim 4, wherein, when the training medical image includes an abnormality, the step of receiving the teacher image includes:

receiving a Gaussian distribution map whose pixels have respective pixel values that represent a likelihood that the pixel is part of an abnormality.

6. The method of claim 5, wherein the step of receiving a Gaussian distribution map includes:

receiving the Gaussian distribution map having a standard deviation proportional to a size of the abnormality.

7. The method of claim 2, wherein the local window moving step includes:

scanning the local window across consecutively physically overlapping sub-regions of the training medical image by moving the local window a predetermined distance for each sub-region.

8. The method of claim 7, wherein the local window moving step includes:

scanning the local window across the consecutively physically overlapping sub-regions of the training medical image by moving the local window a predetermined distance equal to a pixel pitch value in the training medical image, so that successive sub-regions are offset from each other by a separation distance of adjacent pixels in the training medical image.

9. A method of detecting an abnormality in a medical image by using an artificial neural network, the method comprising:

training the artificial neural network using the method of claim 2;

scanning a local window across consecutively physically overlapping sub-regions of the medical image by moving the local window a predetermined distance for each sub-region, so as to obtain respective sub-region pixel sets;

inputting the sub-region pixel sets into the artificial neural network so that the artificial neural network provides, corresponding to the sub-regions, respective output pixel values that each represent a likelihood that respective medical image pixels are part of an abnormality, the output pixel values collectively constituting a likelihood distribution map; and scoring the likelihood distribution map to detect the abnormality.

10. An artificial neural network including network parameters that govern how the artificial neural network operates, the artificial neural network being trained by the steps of:

receiving at least a training image including plural training image pixels;

receiving at least a likelihood distribution map as a teacher image, the teacher image including plural teacher image pixels each having a pixel value indicating a likelihood that a respective training image pixel is part of a target structure;

moving a local window across plural sub-regions of the training image to obtain respective sub-region pixel sets;

inputting the sub-region pixel sets to the artificial neural network so that the artificial neural network provides output pixel values;

comparing the output pixel values to corresponding teacher image pixel values to determine an error; and training the network parameters of the artificial neural network to reduce the error.

11. The artificial neural network of claim 10, wherein:

the training image receiving step includes receiving at least a training medical image; and the local window moving step includes moving the local window across the plural sub-regions of the training medical image to obtain the respective sub-region pixel sets.

12. The artificial neural network of claim 11, wherein the step of receiving at least a training medical image includes:

receiving one or more training medical images that include an abnormality and a normal anatomical structure.

13. The artificial neural network of claim 12, trained by the additional steps of:

coordinating the step of receiving at least an abnormality likelihood distribution map and the step of receiving at least a training medical image, so that:

(1) when the training medical image includes an abnormality, the teacher image pixel values represent likelihoods that corresponding training medical image pixels are part of an abnormality; and (2) when the training medical image does not include an abnormality, the teacher image pixel values represent an absence of an abnormality at corresponding training medical image pixel locations.

14. The artificial neural network of claim 13, wherein, when the training medical image includes an abnormality, the step of receiving the teacher image includes:

receiving a Gaussian distribution map whose pixels have respective pixel values that represent a likelihood that the pixel is part of an abnormality.

15. The artificial neural network of claim 14, wherein the step of receiving a Gaussian distribution map includes:

receiving the Gaussian distribution map having a standard deviation proportional to a size of the abnormality.

16. The artificial neural network of claim 11, wherein the local window moving step includes:

scanning the local window across consecutively physically overlapping sub-regions of the training medical image by moving the local window a predetermined distance for each sub-region.

17. The artificial neural network of claim 16, wherein the local window moving step includes:

scanning the local window across the consecutively physically overlapping sub-regions of the training medical image by moving the local window a predetermined distance equal to a pixel pitch value in the training medical image, so that successive sub-regions are offset from each other by a separation distance of adjacent pixels in the training medical image.

18. A computer program product storing program instructions for execution on a computer system, which when executed by the computer system, cause the computer system to train an artificial neural network having network parameters that govern how the artificial neural network operates by performing the steps of:

receiving at least a training image including plural training image pixels;

receiving at least a likelihood distribution map as a teacher image, the teacher image including plural teacher image pixels each having a pixel value indicating a likelihood that a respective training image pixel is part of a target structure;

moving a local window across plural sub-regions of the training image to obtain respective sub-region pixel sets;

inputting the sub-region pixel sets to the artificial neural network so that the artificial neural network provides output pixel values;

comparing the output pixel values to corresponding teacher image pixel values to determine an error; and training the network parameters of the artificial neural network to reduce the error.

19. The computer program product of claim 18, wherein:

the training image receiving step includes receiving at least a training medical image; and the local window moving step includes moving the local window a across the plural sub-regions of the training medical image to obtain the respective sub-region pixel sets.

20. The computer program product of claim 19, wherein the step of receiving at least a training medical image includes:

receiving one or more training medical images that include an abnormality and a normal anatomical structure.

21. The computer program product of claim 20 storing further program instructions for execution on the computer system, which when executed by the computer system, cause the computer system to train an artificial neural network having network parameters that govern how the artificial neural network operates by performing the additional steps of:

coordinating the step of receiving at least an abnormality likelihood distribution map and the step of receiving at least a training medical image, so that:

(1) when the training medical image includes an abnormality, the teacher image pixel values represent likelihoods that corresponding training medical image pixels are part of an abnormality; and (2) when the training medical image does not include an abnormality, the teacher image pixel values represent an absence of an abnormality at corresponding training medical image pixel locations.

22. The computer program product of claim 21, wherein, when the training medical image includes an abnormality, the step of receiving the teacher image includes:

receiving a Gaussian distribution map whose pixels have respective pixel values that represent a likelihood that the pixel is part of an abnormality.

23. The computer program product of claim 22, wherein the step of receiving a Gaussian distribution map includes:

receiving the Gaussian distribution map having a standard deviation proportional to a size of the abnormality.

24. The computer program product of claim 19, wherein the local window moving step includes:

scanning the local window across consecutively physically overlapping sub-regions of the training medical image by moving the local window a predetermined distance for each sub-region.

25. The computer program product of claim 24, wherein the local window moving step includes:

scanning the local window across the consecutively physically overlapping sub-regions of the training medical image by moving the local window a predetermined distance equal to a pixel pitch value in the training medical image, so that successive sub-regions are offset from each other by a separation distance of adjacent pixels in the training medical image.

26. A method of detecting a target structure in an image by using an artificial neural network, the method comprising:

scanning a local window across sub-regions of the image by moving the local window for each sub-region, so as to obtain respective sub-region pixel sets;

inputting the sub-region pixel sets to the artificial neural network so that the artificial neural network provides, corresponding to the sub-regions, respective output pixel values that represent likelihoods that respective image pixels are part of a target structure, the output pixel values collectively constituting a likelihood distribution map; and scoring the likelihood distribution map to detect the target structure.

27. The method of claim 26, wherein:

the image is a medical image;

the target structure is an abnormality in the medical image;

the scanning step includes scanning the local window across sub-regions of the medical image;

the artificial neural network provides the respective output pixel values that represent the likelihoods that the respective medical image pixels are part of an abnormality; and the scoring step includes scoring the likelihood distribution map to detect the abnormality.

28. The method of claim 27, wherein the scanning step includes:

scanning the local window across consecutively physically overlapping sub-regions of the medical image by moving the local window a predetermined distance for each sub-region, so as to obtain respective sub-region pixel sets.

29. The method of claim 28, wherein:

the predetermined distance is a pixel pitch value in the medical image, so that successive sub-regions are offset from each other by a separation distance of adjacent pixels in the medical image.

30. The method of claim 28, wherein the scoring step includes:

filtering the output pixel values in the likelihood distribution map.

31. The method of claim 30, further comprising:

comparing results of the filtering to at least a threshold value to detect the abnormality.

32. The method of claim 30, wherein the filtering step includes:

filtering the output pixel values with a Gaussian function.

33. The method of claim 28, wherein the artificial neural network includes:

an output layer including units having linear activation functions.

34. An artificial neural network system, comprising:

an artificial neural network configured to detect a target structure in an image;

a scanning mechanism configured to scan a local window across sub-regions of the image by moving the local window for each sub-region, so as to obtain respective sub-region pixel sets:

an inputting mechanism configured to input the sub-region pixel sets to the artificial neural network so that the artificial neural network provides, corresponding to the sub-regions, respective output pixel values that represent likelihoods that respective image pixels are part of the target structure, the output pixel values collectively constituting a likelihood distribution map; and a scoring mechanism configured to score the likelihood distribution map to detect the target structure.

35. The artificial neural network system of claim 34, wherein:

the image is a medical image;

the target structure is an abnormality in the medical image;

the mechanism for scanning includes means for scanning the local window across sub-regions of the medical image;

the artificial neural network is configured to output the respective output pixel values that represent the likelihoods that the respective medical image pixels are part of an abnormality; and the mechanism for scoring includes means for scoring the likelihood distribution map to detect the abnormality.

36. The artificial neural network system of claim 35, wherein the mechanism for scanning includes:

means for scanning the local window across consecutively physically overlapping sub-regions of the medical image by moving the local window a predetermined distance for each sub-region, so as to obtain respective sub-region pixel sets.

37. The artificial neural network system of claim 36, wherein:

the predetermined distance is a pixel pitch value in the medical image, so that successive sub-regions are offset from each other by a separation distance of adjacent pixels in the medical image.

38. The artificial neural network system of claim 36, wherein the means for scoring includes:

a filter configured to filter the output pixel values in the likelihood distribution map.

39. The artificial neural network system of claim 38, further comprising:

a comparing mechanism for comparing results of the means for filtering to at least a threshold value to detect the abnormality.

40. The artificial neural network system of claim 38, wherein the filter is configured to filter the output pixel values with a Gaussian function.

41. The artificial neural network system of claim 36, wherein the artificial neural network includes:

an output layer including units having linear activation functions.

42. A computer program product storing program instructions for execution on a computer system, which when executed by the computer system, cause the computer system to detect a target structure in an image by using an artificial neural network by performing the steps of:

scanning a local window across sub-regions of the image by moving the local window for each sub-region, so as to obtain respective sub-region pixel sets;

inputting the sub-region pixel sets to the artificial neural network so that the artificial neural network provides corresponding to the sub-regions respective output pixel values that represent likelihoods that respective image pixels are part of a target structure, the output pixel values collectively constituting a likelihood distribution map; and scoring the likelihood distribution map to detect the target structure.

43. The computer program product of claim 42, wherein:

the image is a medical image;

the target structure is an abnormality in the medical image;

the scanning step includes scanning the local window across sub-regions of the medical image;

the artificial neural network provides the respective output pixel values that represent the likelihoods that the respective medical image pixels are part of an abnormality; and the scoring step includes scoring the likelihood distribution map to detect the abnormality.

44. The computer program product of claim 43, wherein the scanning step includes:

scanning the local window across consecutively physically overlapping sub-regions of the medical image by moving the local window a predetermined distance for each sub-region, so as to obtain respective sub-region pixel sets.

45. The computer program product of claim 44, wherein:

the predetermined distance is a pixel pitch value in the medical image, so that successive sub-regions are offset from each other by a separation distance of adjacent pixels in the medical image.

46. The computer program product of claim 44, wherein the scoring step includes:

filtering the output pixel values in the likelihood distribution map.

47. The computer program product of claim 46 storing program instructions for execution on the computer system, which when executed by the computer system, cause the computer system to detect a target structure in an image by using an a artificial neural network by performing the additional steps of:

comparing results of the filtering to at least a threshold value to detect the abnormality.

48. The computer program product of claim 46, wherein the filtering step includes:

filtering the output pixel values with a Gaussian function.

49. The computer program product of claim 44, wherein the artificial neural network includes:

an output layer including units having linear activation functions.

50. An apparatus for detecting a target structure in an image, the apparatus comprising:

a network configured to receive sub-region pixel sets from respective sub-regions of the image, and to operate on the sub-region pixel sets so as to produce a likelihood distribution map including output pixel values that represent likelihoods that corresponding image pixels are part of the target structure.

51. The apparatus of claim 50, wherein:

the image is a medical image;

the target structure is an abnormality in the medical image; and the network is configured to receive the sub-region pixel sets from the respective sub-regions of the medical image, and to operate on the sub-region pixel sets so as to produce the likelihood distribution map including the output pixel values that represent the likelihoods that corresponding medical image pixels are part of the abnormality.

52. The apparatus of claim 51, comprising:

a pixel set generation mechanism configured to apply to the network sub-region pixel sets from respective consecutively physically overlapping sub-regions of the medical image.

53. The apparatus of claim 52, wherein the network operates in accordance with network parameters, and the apparatus further comprises:

a training portion configured to train the network parameters in accordance with (a) teacher image pixel values that represent a likelihood distribution of pixels portraying a detected abnormality, and (b) a training period likelihood distribution map that includes output pixels produced by the network operating on at least one training medical image, the output pixels respectively representing likelihoods that corresponding medical image pixels are part of the abnormality.

54. The apparatus of claim 53, wherein:

the network is further configured to receive, during a training period, sub-region pixel sets from respective consecutively physically overlapping sub-regions of the at least one training medical image, and to operate in accordance with the network parameters on the sub-region pixel sets so as to produce the training period likelihood distribution map.

55. An apparatus for detecting an abnormality in a medical image, the apparatus comprising:

first through N-th artificial neural networks constituting respective apparatus formed in accordance with any of claims 52, 53 or 54, N being an integer greater than 1, that have been commonly trained on a same abnormality and on first through N-th mutually different normal structures, the first through N-th artificial neural networks being configured to output first through N-th respective indications of whether a structure in the medical image is an abnormality or a normal anatomical structure; and a combiner that is configured to combine the first through N-th indications to form a combined indication of whether the structure in the medical image is an abnormality or a normal anatomical structure.

56. A method for detecting an abnormality in a medical image, the method comprising:

training first through N-th artificial neural networks constituting respective apparatus formed in accordance with any of claims 52, 53 or 54, N being an integer greater than 1, on a same abnormality and on first through N-th mutually different normal an anatomical structures, the first through N-th artificial neural networks being configured to output first through N-th respective indications of whether the medical image includes an abnormality or a normal anatomical structure; and combining the first through N-th indications to form a combined indication of whether the medical image includes an abnormality or a normal anatomical structure.

57. The apparatus of any of claims 52, 53 or 54, wherein: the network constitutes an artificial neural network.

58. The apparatus of claim 57, wherein the artificial neural network includes:

an output layer including at least one unit having a linear activation function.

59. The apparatus of either of claims 53 or 54, wherein the likelihood distribution constitutes:

a Gaussian function centered about a center of a portrayal of a detected abnormality.

60. The apparatus of claim 59, wherein:

a standard deviation of the Gaussian function varies with a size of the portrayal of the detected abnormality.

61. The apparatus of claim 52, further comprising:

a filter configured to receive the likelihood distribution map from the network and to provide a score whose value indicates whether the medical image includes an abnormality.

62. The apparatus of claim 52, wherein the pixel set generation mechanism comprises:

a scanning mechanism configured to scan a local window across an input image by moving the local window a predetermined distance for each sub-region.

63. The apparatus of claim 62, wherein:

the predetermined distance is a pixel pitch value in the input image, so that successive sub-regions are offset from each other by a separation distance of adjacent pixels in the input image.

64. A method for detecting a target structure in an image, the method comprising:

training first through N-th artificial neural networks, N being an integer greater than 1, on either (A) a same target structure and first through N-th mutually different non-target structures, or (B) a same non-target structure and first through N-th mutually different target structures, the first through N-th artificial neural networks being configured to output first through N-th respective indications of whether the image includes a target structure or a non-target structure; and combining the first through N-th indications to form a combined indication of whether the image includes a target structure or a non-target structure.

65. The method of claim 64, wherein:

the image is a medical image;

the target structure is an abnormality in the medical image;

the non-target structures are normal anatomical structures;

the training step includes training the first through N-th artificial neural networks on either (A) a same abnormality and first through N-th mutually different normal anatomical structures, or (B) a same normal anatomical structure and first through N-th mutually different abnormalities, the first through N-th artificial neural networks being configured to output first through N-th respective indications of whether the medical image includes an abnormality or a normal anatomical structure; and the combining step includes combining the first through N-th indications to form a combined indication of whether the medical image includes an abnormality or a normal anatomical structure.

66. The method of claim 65, wherein the training step includes:

training first through N-th artificial neural networks on the same abnormality and on the first through N-th mutually different normal anatomical structures.

67. The method of claim 66, wherein the combining step includes:

providing a combined indication of an abnormality using a logical AND combiner.

68. The method of claim 67, wherein the combining step includes:

providing a combined indication of an abnormality, only if all first through N-th respective indications indicate an abnormality.

69. The method of claim 65, wherein:

the training step includes training first through N-th artificial neural networks on the same normal anatomical structure and on the first through N-th mutually different abnormalities; and the combining step includes providing a combined indication of a normal anatomical structure, only if all first through N-th respective indications indicate a normal anatomical structure.

70. The method of claim 65, wherein the training step includes training the artificial neural networks using a normal anatomical structure include at least one from a group including:

large vessels in the hilum;

large vessels with opacities;

medium-sized vessels;

small vessels;

soft-tissue opacities caused by a heart;

soft-tissue opacities caused by a diaphragm;

soft-tissue opacities caused by a partial volume effect between peripheral vessels and the diaphragm;

abnormal opacities; and focal infiltrative opacities.

71. A computer program product storing program instructions for execution on a computer system, which when executed by the computer system, cause the computer system to detect a target structure in an image by performing the steps of:

training first through N-th artificial neural networks, N being an integer greater than 1, on either (A) a same target structure and first through N-th mutually different non-target structures, or (B) a same non-target structure and first through N-th mutually different target structures, the first through N-th artificial neural networks being configured to output first through N-th respective indications of whether the image includes a target structure or a non-target structure; and combining the first through N-th indications to form a combined in indication of whether the image includes a target structure or a non-target structure.

72. The computer program product of claim 71, wherein:

the image is a medical image;

the target structure is an abnormality in the medical image;

the non-target structures are normal anatomical structures;

the training step includes training the first through N-th artificial neural networks on either (A) a same abnormality and first through N-th mutually different normal anatomical structures, or (B) a same normal anatomical structure and first through N-th mutually different abnormalities, the first through N-th artificial neural networks being configured to output first through N-th respective indications of whether the medical image includes an abnormality or a normal anatomical structure; and the combining step includes combining the first through N-th indications to form a combined indication of whether the medical image includes an abnormality or a normal anatomical structure.

73. The computer program product of claim 72, wherein the training step includes:

first through N-th artificial neural networks on the same abnormality and on the first through N-th mutually different normal anatomical structures.

74. The computer program product of claim 73, wherein the combining step includes:

providing a combined indication of an abnormality using a logical AND combiner.

75. The computer program product of claim 74, wherein the combining step includes:

providing a combined indication of an abnormality, only if all first through N-th respective indications indicate an abnormality.

76. The computer program product of claim 72, wherein:

the training step includes training first through N-th artificial neural networks on the same normal anatomical structure and on the first through N-th mutually different abnormalities; and the combining step includes providing a combined indication of abnormal anatomical structure, only if all first through N-th respective indications indicate a normal anatomical structure.

77. The computer program product of claim 72, wherein he training step includes training the artificial neural networks using a normal anatomical structure include at least one from a group including:

large vessels in the hilum;

large vessels with opacities;

medium-sized vessels;

small vessels;

soft-tissue opacities caused by a heart;

soft-tissue opacities caused by a diaphragm;

soft-tissue opacities caused by a partial volume effect between peripheral vessels and the diaphragm;

abnormal opacities; and focal infiltrative opacities.

78. An apparatus for detecting a target structure in an image, the apparatus comprising:

first through N-th artificial neural networks, N being an integer greater than 1, that have been trained on either (A) a same target structure and first through N-th mutually different non-target structures, or (B) a same non-target structure and first through N-th mutually different target structures, the first through N-th artificial neural networks being configured to output first through N-th respective indications of whether the image includes a target structure or a non-target structure; and a combiner configured to combine the first through N-th indications to form a combined indication of whether the medical image includes a target structure or a non-target structure.

79. The apparatus of claim 78, wherein:

the image is a medical image;

the target structure is an abnormality in the medical image;

the non-target structures are normal anatomical structures;

the first through N-th artificial neural networks have been trained on either (A) a same abnormality and first through N-th mutually different normal anatomical structures, or (B) a same normal anatomical structure and first through N-th mutually different abnormalities, the first through N-th artificial neural networks being configured to output first through N-th respective indications of whether the medical image includes an abnormality or a normal anatomical structure; and the combiner is configured to combine the first through N-th indications to form the combined indication of whether the medical image includes an abnormality or a normal anatomical structure.

80. The apparatus of claim 79, wherein:

the artificial neural networks have been trained on a same abnormality and first through N-th mutually different normal anatomical structures.

81. The apparatus of claim 80, wherein the combiner includes:

a logical AND combiner that provides a combined indication of an abnormality.

82. The apparatus of claim 81, wherein the combiner includes:

a logical AND combiner that provides a combined indication of an abnormality, only if all first through N-th respective indications indicate an abnormality.

83. The apparatus of claim 79, herein:

the artificial neural networks have been trained on a same normal anatomical structure and first through N-th mutually different abnormalities; and the combiner includes a logical AND combiner that provides a combined indication of a normal anatomical structure, only if all first through N-th respective indications indicate a normal anatomical structure.

84. The apparatus of claim 79, wherein the artificial neural networks have been trained on a normal anatomical structure include at least one from a group including:

large vessels in the hilum;

large vessels with opacities;

medium-sized vessels;

small vessels;

soft-tissue opacities caused by a heart;

soft-tissue opacities caused by a diaphragm;

soft-tissue opacities caused by a partial volume effect between peripheral vessels and the diaphragm;

abnormal opacities; and focal infiltrative opacities.

* * * * *